United States Patent
Almhana et al.

(10) Patent No.: US 9,065,751 B2
(45) Date of Patent: Jun. 23, 2015

(54) BANDWIDTH PROVISIONING TOOLS FOR INTERNET SERVICE PROVIDERS

(75) Inventors: Jalal Almhana, Moncton (CA); Robert McGorman, Ottawa (CA); Zikuan Liu, Moncton (CA)

(73) Assignee: Jalal Almhana, Moncton (CA)

( * ) Notice: Subject to any disclaimer, the term of this patent is extended or adjusted under 35 U.S.C. 154(b) by 689 days.

(21) Appl. No.: 12/660,607

(22) Filed: Mar. 1, 2010

(65) Prior Publication Data

US 2011/0007630 A1    Jan. 13, 2011

Related U.S. Application Data

(60) Provisional application No. 61/208,845, filed on Feb. 27, 2009.

(51) Int. Cl.
| | | |
|---|---|---|
| H04L 12/26 | (2006.01) | |
| H04L 12/24 | (2006.01) | |
| H04L 12/54 | (2013.01) | |
| H04L 12/927 | (2013.01) | |
| H04L 12/911 | (2013.01) | |

(52) U.S. Cl.
CPC .......... *H04L 41/147* (2013.01); *H04L 12/5695* (2013.01); *H04L 41/0896* (2013.01); *H04L 41/142* (2013.01); *H04L 41/145* (2013.01); *H04L 47/801* (2013.01); *H04L 47/805* (2013.01); *H04L 47/822* (2013.01); *H04L 47/823* (2013.01)

(58) Field of Classification Search
CPC . H04L 45/22; H04L 65/1069; H04L 43/0852; H04L 43/16; H04L 63/08
USPC .................. 370/230, 231, 403, 390; 375/219; 714/15, 33
See application file for complete search history.

(56) References Cited

U.S. PATENT DOCUMENTS

| | | | | |
|---|---|---|---|---|
| 5,883,819 A | * | 3/1999 | Abu-Amara et al. | 716/106 |
| 7,467,329 B1 | * | 12/2008 | Keeton et al. | 714/15 |
| 7,471,685 B2 | * | 12/2008 | Wu | 370/395.21 |
| 2007/0147371 A1 | * | 6/2007 | Radha et al. | 370/390 |
| 2010/0118925 A1 | * | 5/2010 | Karabinis | 375/219 |

* cited by examiner

*Primary Examiner* — Jamal Javaid
(74) *Attorney, Agent, or Firm* — MU Patents; Timothy Marc Shropshire

(57) ABSTRACT

An accurate bandwidth provisioning tool for Internet Service Providers, for both Voice over IP and data traffic, which is able to predict the demand for network resources based on the network traffic characteristics and the number of subscribers after taking into account subscriber growth and other relevant factors. To predict the demand, the tool uses a Gaussian model for Voice traffic, and a Gamma model, or alternatively, a dimensioning formula, for data traffic. The tool also discloses a method of planning Cable television network capacity when converting analog channels to digital channels.

12 Claims, 10 Drawing Sheets

Figure 1. Voice Over Internet Protocol Bandwidth Calculator
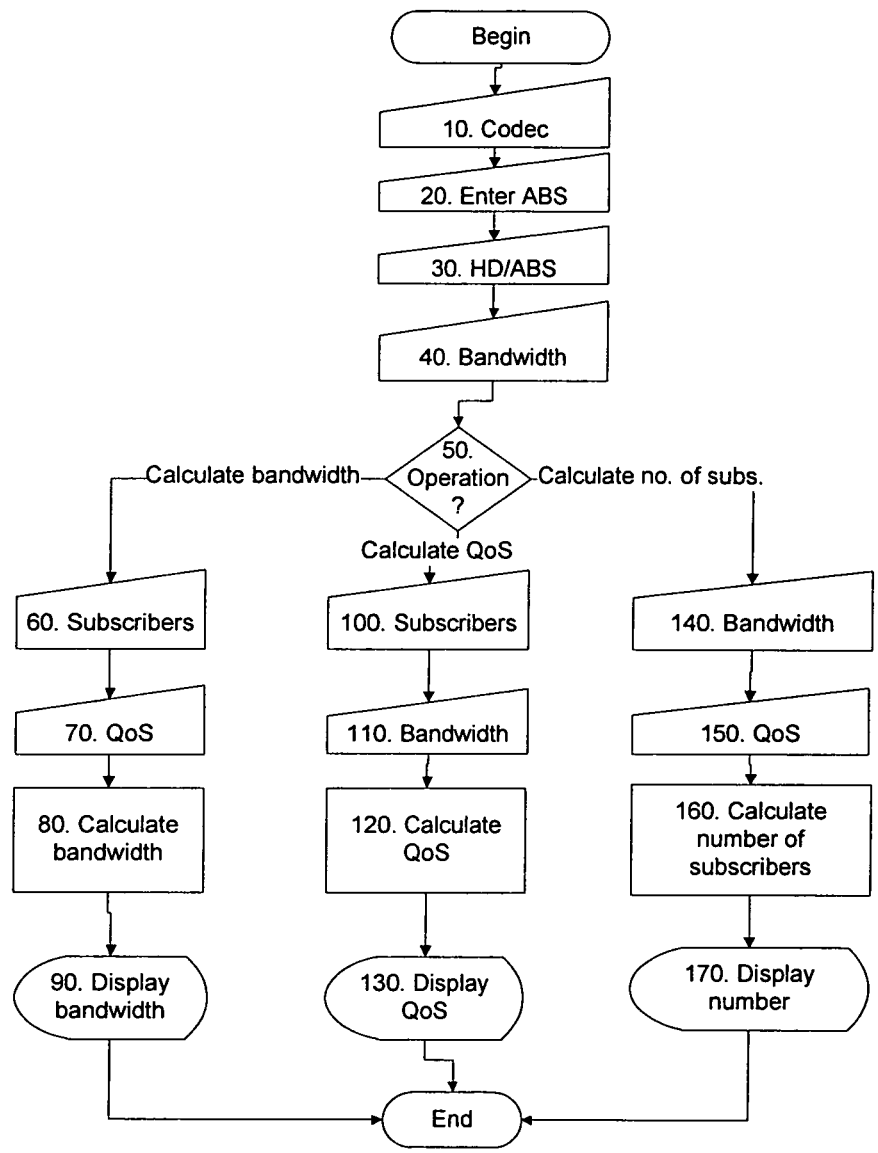

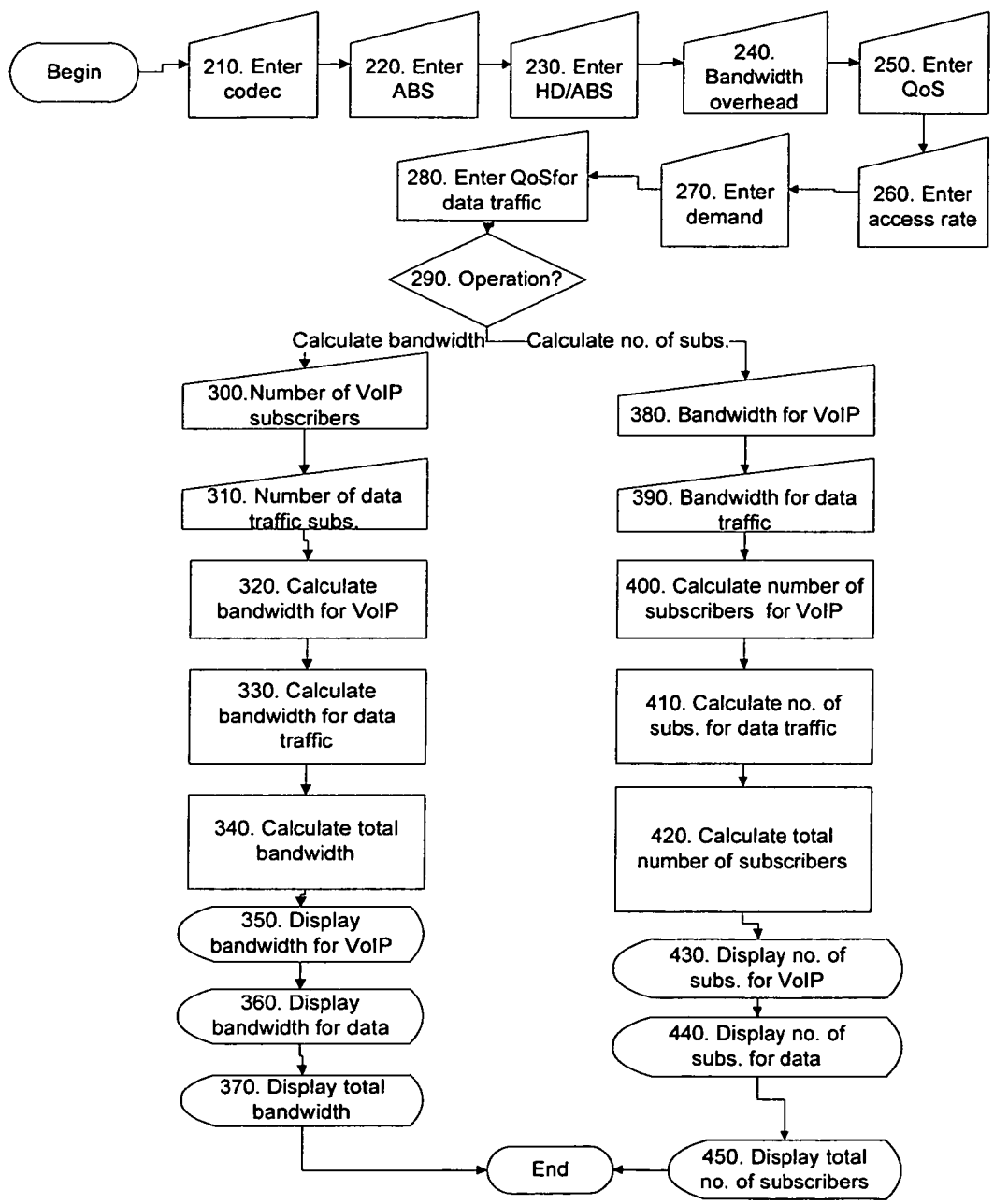
Figure 2. Voice and Data Calculator

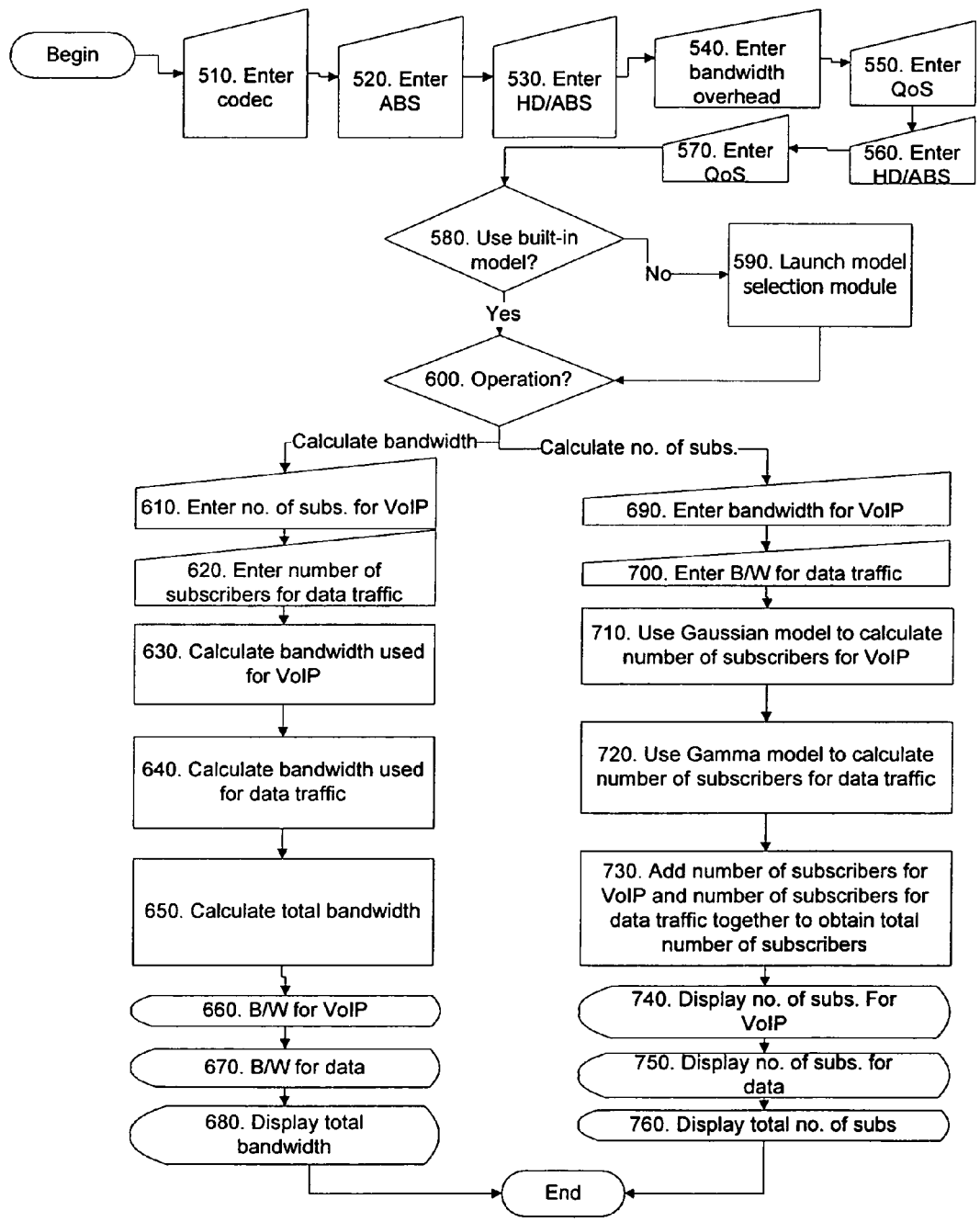
Figure 3. Voice and Traffic Based Data Calculator

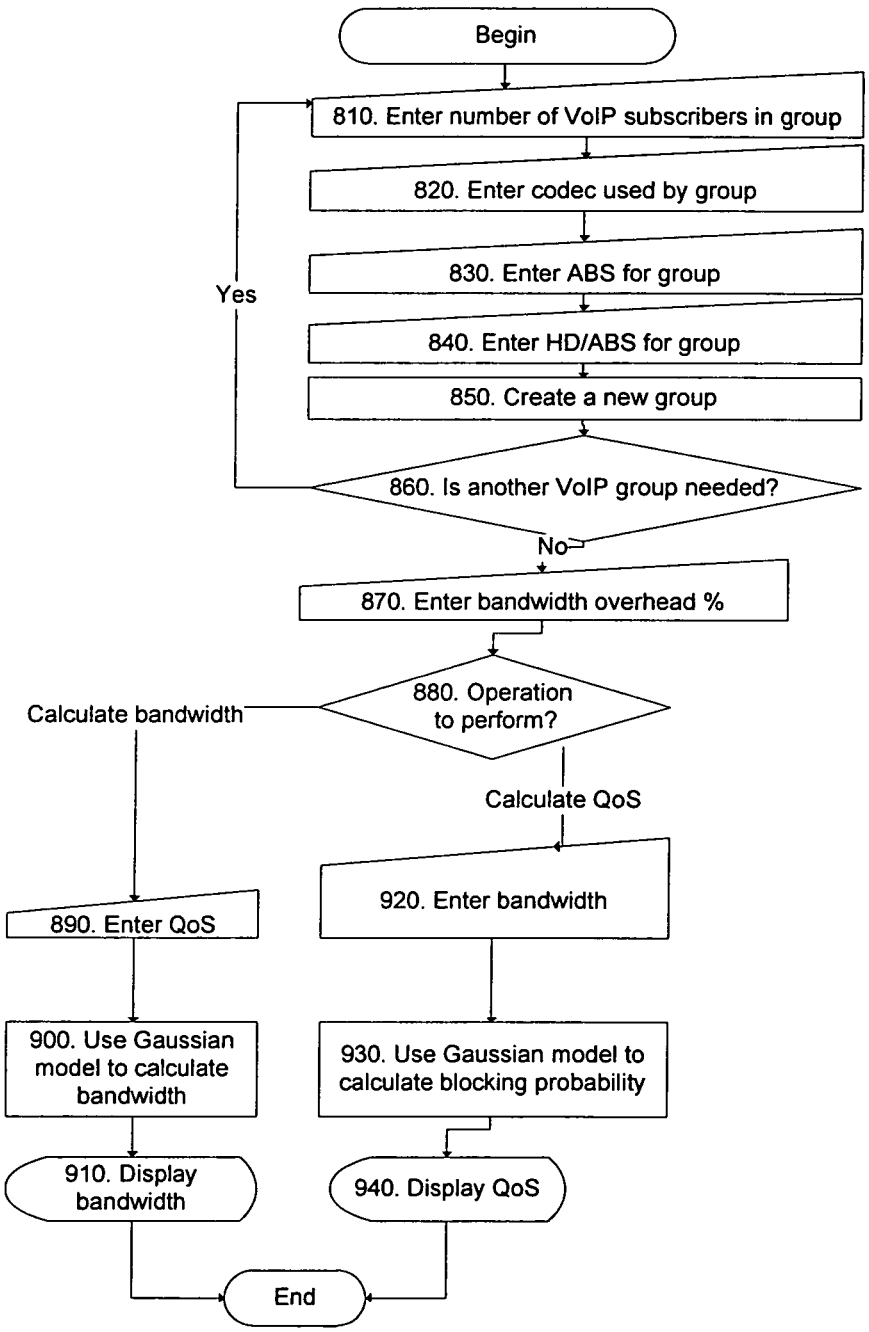
Figure 4. Multi-Codec Voice over IP Calculator

Figure 5. HSDT Dimensioning Calculator
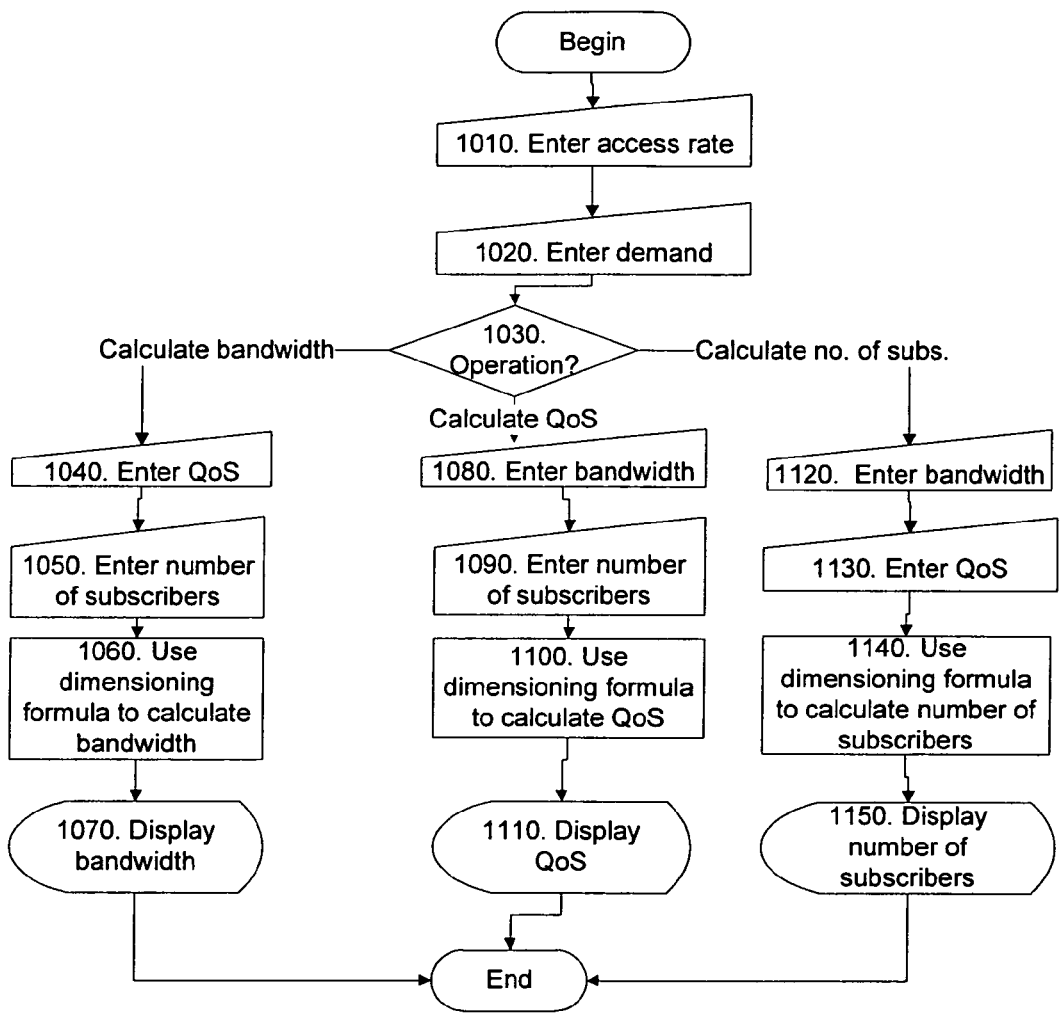

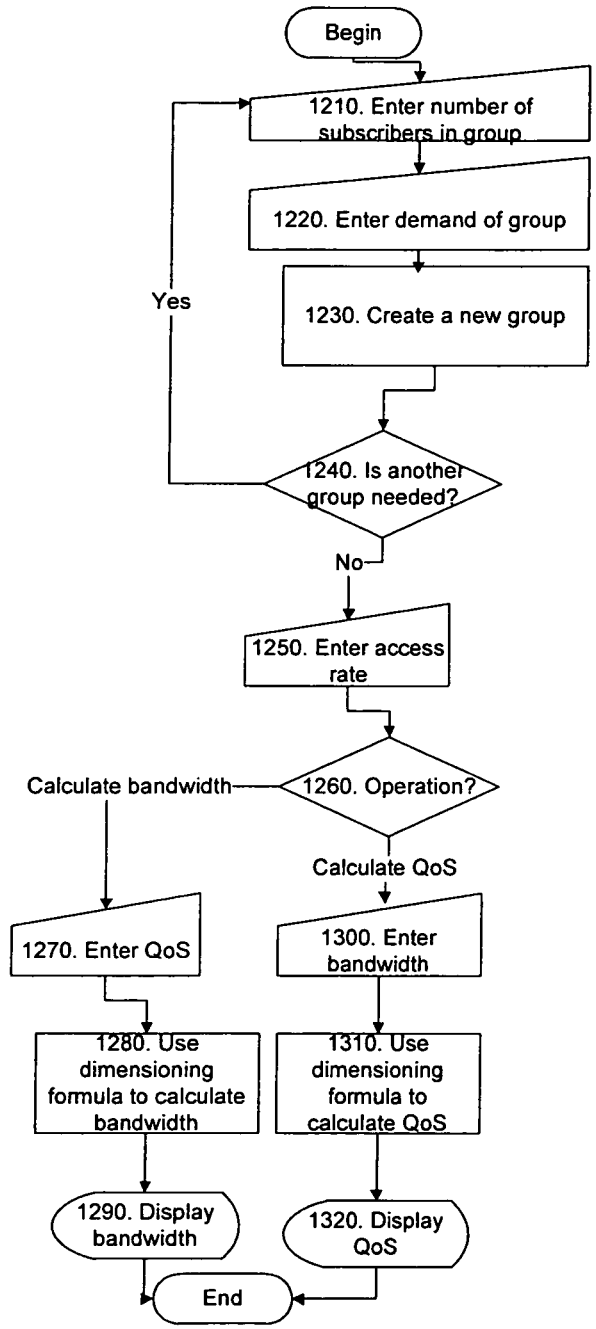
Figure 6. Multi-Group HSDT Dimensioning Calculator

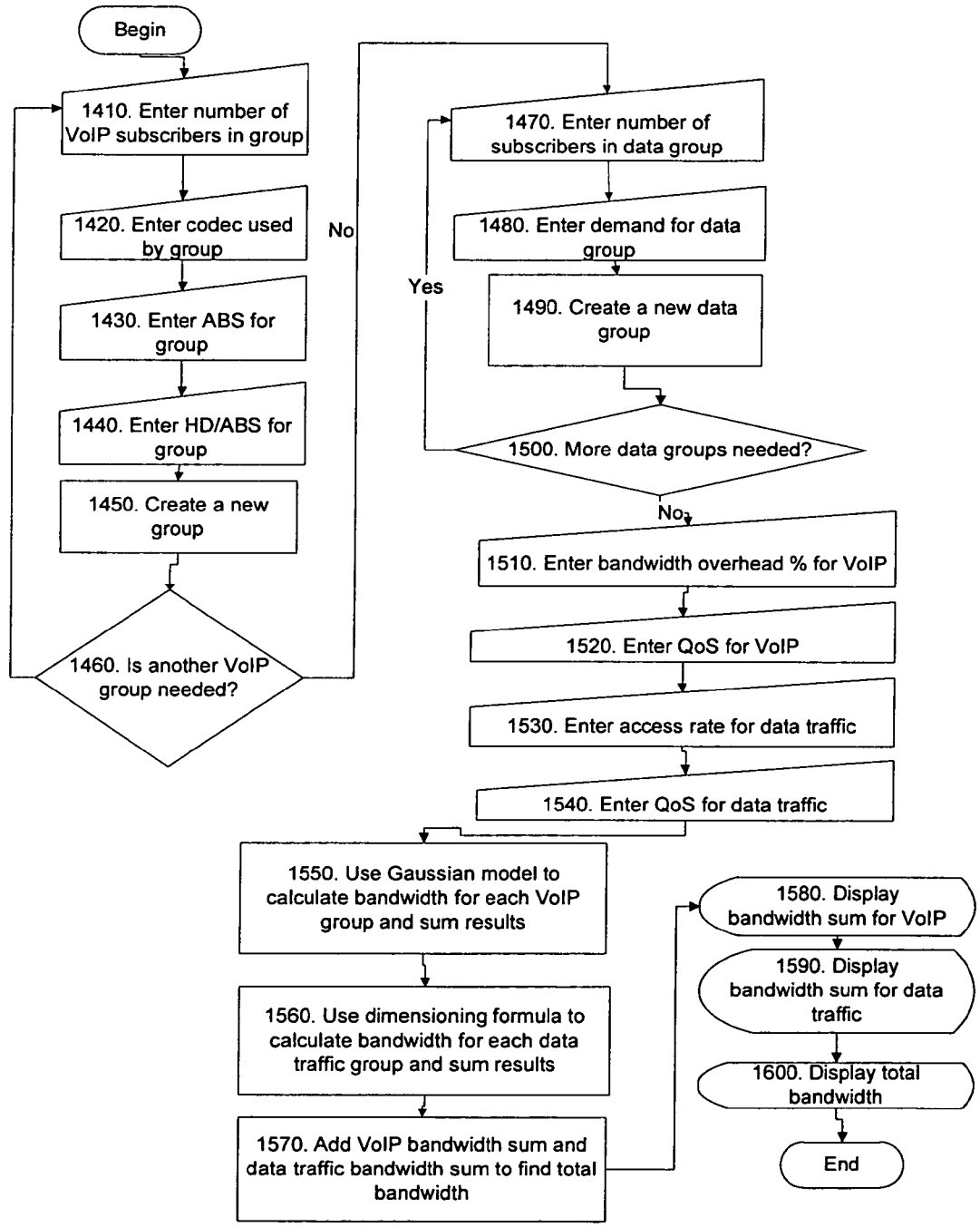
Figure 7. Multi-Group Voice and Data Calculator

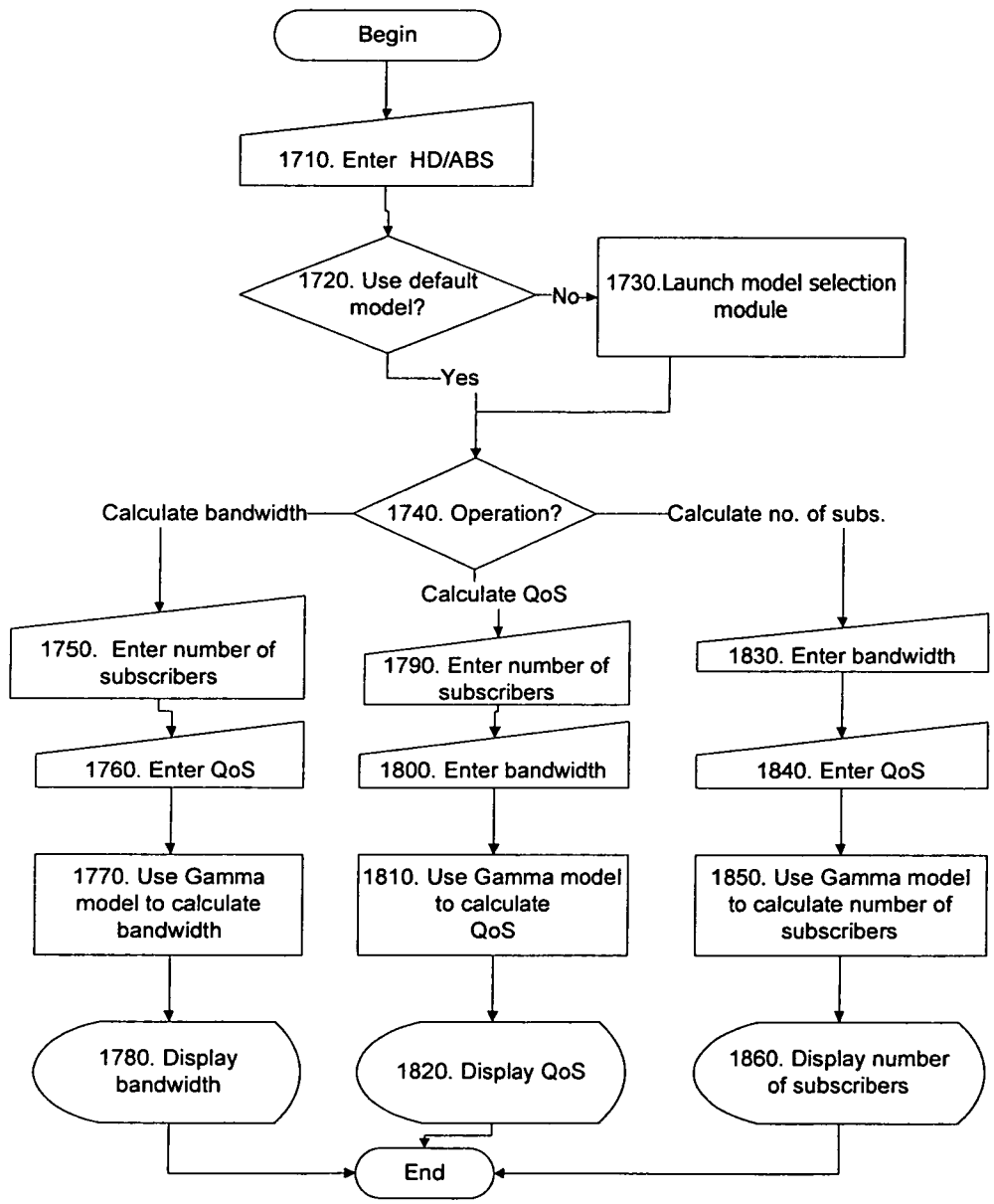
Figure 8. Traffic Based HSDT Calculator

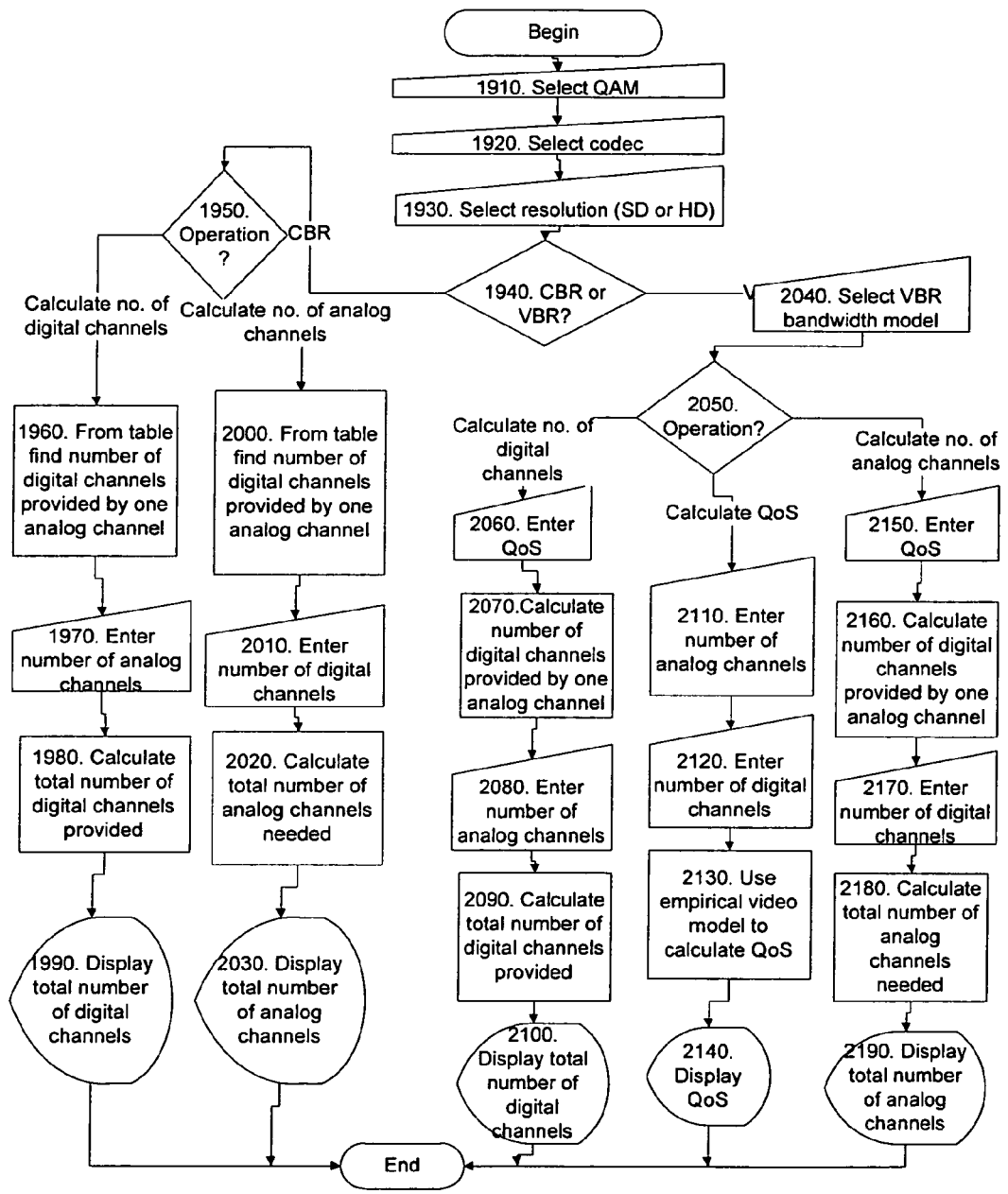
Figure 9. Cable TV Calculator

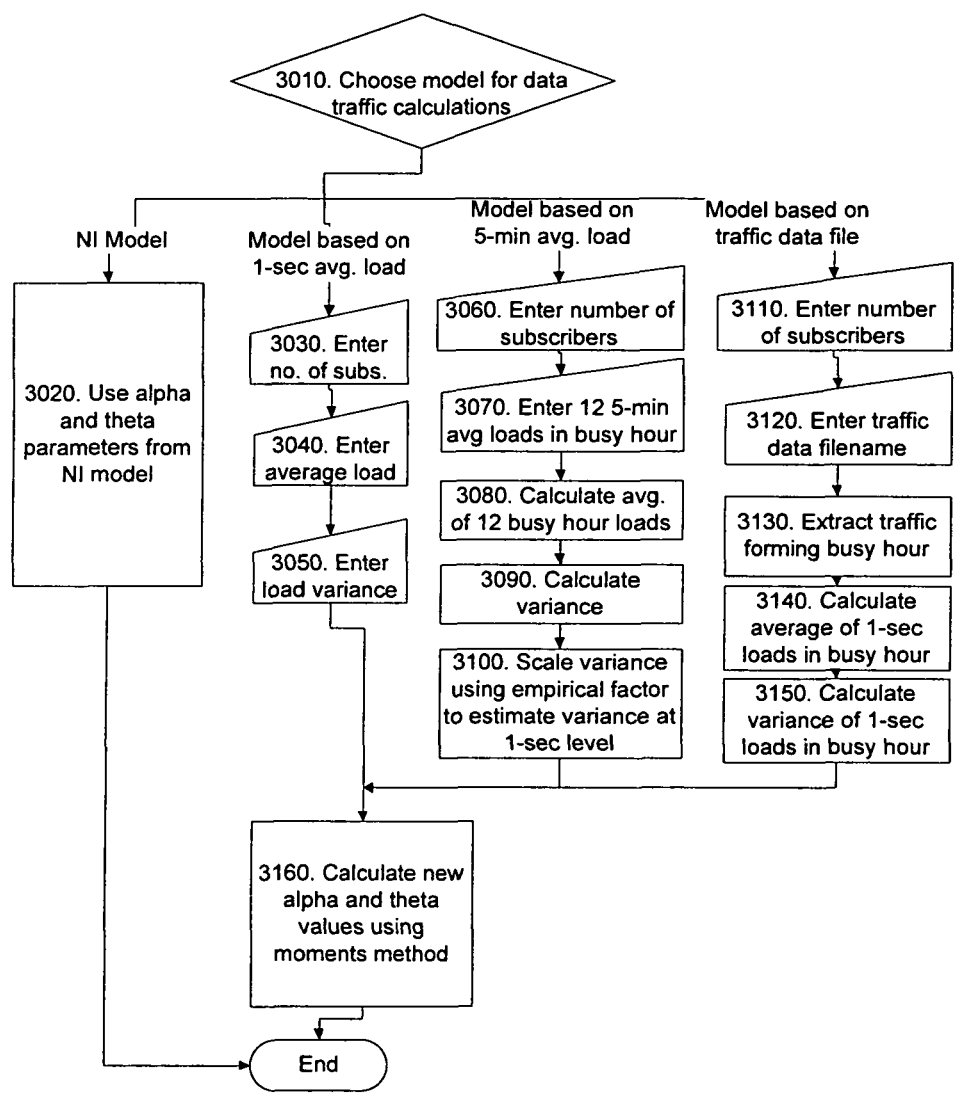
Figure 10. Model Selection

BANDWIDTH PROVISIONING TOOLS FOR INTERNET SERVICE PROVIDERS

CROSS-REFERENCE TO RELATED APPLICATION

This application claims priority of U.S. Provisional Application No. 61/208,845, filed Feb. 27, 2009, under Title 35, United States Code, Section 119(e).

BACKGROUND OF THE INVENTION

1. Field of the Invention

The invention relates generally to capacity planning and bandwidth provisioning for access networks, and specifically, capacity planning and bandwidth provisioning for video, voice over IP (VoIP) and Internet data traffic over cable or digital subscriber line (DSL) access networks using sampled traffic to create a provisioning model. The invention also relates to video bandwidth planning associated with conversion of analog cable TV channels into digital channels.

2. Description of the Prior Art

Internet service providers frequently include a quality-of-service (QoS) guarantee in their service level agreements. The QoS guaranteed may include network availability and reachability. ISPs may also include end-to-end delay benchmarks within their networks in service level agreements. Such benchmarks may allow ISPs to provide better services to existing applications, such as web browsing, as well as to new emerging services such as IP telephony (VoIP) and Internet video, by providing guarantees of achieving such benchmarks. In addition, QoS gives an Internet provider an edge in an increasingly competitive marketplace, in that customers are able to receive VoIP and video, both time-sensitive applications, in such a manner that coherent voice and video streams are communicated.

The ability to plan and provision the capacity of access networks in such a way that the priority of time-sensitive applications is preserved, yet effective data rates are achieved in Internet applications, is critical to the business model of any Internet Service Provider (ISP). Measurement tools may monitor the network for performance statistics, and identify where the network provider needs to allocate more network resources. However, performance statistics alone cannot provide the precise amount and timing of capacity additions needed, especially at points that currently are not bottlenecks. Performance statistics are also of limited value when rapid subscriber growth or system consolidation is expected. In such cases planning errors can cause customer dissatisfaction if QoS levels fall, or wastage of expensive resources when provisioning is ad hoc or needlessly liberal. For several years there has been widespread rapid growth in the numbers of subscribers to internet access services provided by cable and telephone company ISPs. Holding other factors constant, we have found that subscriber growth produces nonlinear changes in the amount of bandwidth required to provide a constant QoS level. Thus it is crucial for bandwidth projections to take explicit account of subscriber growth, and to take advantage of associated economies of scale. VoIP service quality deteriorates rapidly with increasing delay (latency); however VoIP may rely on a 'best efforts' protocol. As a result there must be appropriate bandwidth provisioning not only for VoIP service itself but for other services that share physical facilities for transmission.

Because of ongoing evolution of internet applications and usages, it is also important that bandwidth provisioning tools be easily upgraded and customized to the needs of ISPs. For example, some ISPs have implemented monthly limits on downloads while others have not. To reflect the possible impact on subscriber usage patterns, we have included in our tools a traffic model for each case, as well as tool functionality to build a traffic model from the tool user's custom traffic statistics or a file containing a full busy hour traffic trace.

Therefore there is a need for an accurate bandwidth provisioning tool for ISPs, for both VoIP and data traffic, which is able to predict the demand for the network resources based on the network traffic characteristics and the number of subscribers after taking into account subscriber growth and other relevant factors. Further, these tools should be as clear and easy to use as possible, providing contextual help where appropriate. This predictive tool will enable the ISP to allocate scarce resources to the most advantageous effect, and to do this planning on a 'just in time' basis to optimize the enormous capital investment costs.

SUMMARY OF THE INVENTION

The present invention discloses an accurate bandwidth provisioning tool for Internet Service Providers, for both Voice over Internet Protocol (VoIP) and data traffic, which is able to predict the demand for network resources based on the network traffic characteristics and the number of subscribers after taking into account subscriber growth and other relevant factors. To predict the demand, the tool uses a Gaussian model for Voice traffic, and a Gamma model, or alternatively, a dimensioning formula, for data traffic. The tool also discloses a method of planning Cable television network capacity when converting analog channels to digital channels.

The Voice over Internet Protocol Bandwidth Calculator enables telephone companies, cable companies, internet service providers, and business enterprises to plan, convert to and expand packet voice access networks. The calculator computes any one of the three quantities: access link bandwidth, the maximum number of subscribers, or the quality of service, when the other two quantities are known.

The Voice and Data Calculator enables cable companies, internet service providers, and business enterprises to plan, convert and expand the capacity of their access networks that provide Voice over Internet Protocol and high speed internet services. The calculator is capable of computing required bandwidth or numbers of subscribers for both VoIP and High Speed Data Traffic (HSDT) subscribers for given profiles of VoIP and HSDT subscribers.

The Voice and Traffic Based Data Calculator enables Internet Service Providers to plan and expand their voice and data access network capacities based on modeling of real network traffic. The user of the calculator can choose built-in traffic models fitted to typical traffic traces or build a model from a real data traffic trace provided by the tool user. The calculator computes one of the two quantities, either access link bandwidth, or the maximum numbers of high speed data traffic subscribers and VoIP subscribers, when the available bandwidths for voice and for data are known.

The Multi-Codec Voice over IP Calculator enables telephone companies, cable companies, internet service providers, and business enterprises to plan, convert into and expand packet voice access networks that provide VoIP services with various codec devices. For a given number of subscriber groups, the calculator computes either of the two quantities: access link bandwidth or the quality of service, when the other quantity is known.

The High Speed Data Traffic (HSDT) Dimensioning Calculator enables high speed Internet Service Providers (ISPs) to plan and expand their network capacity. The HSDT calculator computes the relationship between the amount of bandwidth, quality of service (QoS), and the number of subscribers. The HSDT calculator computes any one of the three quantities: bandwidth, quality of service and number of subscribers, when the other two are given.

The Multi-Group High Speed Data Traffic Dimensioning Calculator enables Internet Service Providers to plan and expand the capacities of their networks that support diverse service requirements. For given groups of subscribers with different service requirements, this calculator computes either the quality of service or required bandwidth, if the other one is given. To conduct the calculations, the user of the calculator must input the access rate, which is defined as the speed that the ISP provides to a customer.

The Multi-Group Voice and Data Calculator enables Internet Service Providers to plan and expand their network capacities. For given groups of subscribers with different service requirements, this calculator computes the required bandwidth expressed in Mbps. The calculator first creates profiles for voice over IP subscriber groups and data subscriber groups, and then applies dimensioning formulas to compute the required bandwidth.

The Traffic Based High Speed Data Traffic Calculator enables Internet Service Providers to plan and expand their access network capacities based on modeling of real network traffic. The user of the calculator can choose built-in traffic models fitted from typical traffic traces or build a model from user-provided statistics or a data file containing a traffic trace. The calculator computes any one of the following three quantities: access link bandwidth, the maximum number of subscribers, or quality of service, when the other two quantities are given.

Finally, the Cable TV Calculator allows cable TV companies to compute their planned network capacities after converting some analog channels to digital. For a constant bit rate, the calculator can determine one of the number of analog channels or the number of digital channels, given the other quantity. For a variable bit rate, the calculator can determine one of the total number of analog channels, the total number of digital channels or the quality of service when the other two are given.

BRIEF DESCRIPTION OF THE DRAWINGS

It will now be convenient to describe the invention with particular reference to one embodiment of the present invention. It will be appreciated that the diagrams relate to one embodiment of the present invention only and are not to be taken as limiting the invention.

FIG. 1 is a flowchart representing the Voice over Internet Protocol Bandwidth Calculator, according to one embodiment of the present invention;

FIG. 2 is a flowchart representing the Voice and Data Calculator, according to one embodiment of the present invention;

FIG. 3 is a flowchart representing the Voice and Traffic Based Data Calculator, according to one embodiment of the present invention;

FIG. 4 is a flowchart representing the Multi-Codec Voice over IP Calculator, according to one embodiment of the present invention;

FIG. 5 is a flowchart representing the HSDT Dimensioning Calculator, according to one embodiment of the present invention;

FIG. 6 is a flowchart representing the Multi-Group HSDT Dimensioning Calculator, according to one embodiment of the present invention;

FIG. 7 is a flowchart representing the Multi-Group Voice and Data Calculator, according to one embodiment of the present invention;

FIG. 8 is a flowchart representing the Traffic Based HSDT Calculator, according to one embodiment of the present invention;

FIG. 9 is a flowchart representing the Cable TV Calculator, according to one embodiment of the present invention; and FIG. 10 is a flowchart representing the Model Selection process, according to one embodiment of the present invention.

DETAILED DESCRIPTION OF THE PRESENT INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

The present invention focuses on QoS (quality of service) expressed as a probability that a specified amount of bandwidth is sufficient to meet all demands over a brief period. This blocking calculation approach achieves analytical simplification and quick, repeatable results. It avoids the need for potentially slower and more complicated simulation-based tools to determine QoS. For delay results we have done studies giving QoS in terms of both blocking and delay. These allow an approximate translation from blocking into delay criteria.

An issue of great importance to ISPs is the enormous cost to increase access network bandwidth in order to add new services or maintain QoS and subscriber satisfaction. When expansions are necessary, the work should be planned so that construction lead times do not result in dissatisfaction and subscriber loss. On the other hand, construction should be carried out at the optimal time to minimize project financing costs and interest expenses on debt. The current invention can be used by ISP planners to better understand where and when access network bandwidth expansions should occur.

The current invention is implemented in a microprocessor-based system. Alternative implementations of the invention are possible and likely to be advantageous. For example, functionality in whole or in part of the current invention could be embedded in individual network elements, Operations Support Systems and other quality monitoring and reporting systems of service providers, including but not limited to those of ISPs, telephone companies, cable and satellite TV operators, and manufacturers of networking equipment. It is also possible to adapt the current invention for high volume and distributed applications in the network management outsourcing business.

A current issue of great concern to ISPs is the vulnerability of access network QoS to large volumes of video traffic generated by Peer-to-Peer applications. ISPs are very interested in the effectiveness of defensive measures such as traffic shaping and bandwidth throttling. Because of its flexibility the present invention has provided key results in a research study of P2P traffic impacts on QoS, and on improvements in QoS that result when P2P traffic is throttled to various levels.

One embodiment of the present invention for determining capacity planning for a network includes a microprocessor-based system, which comprises a storage medium which contains stored data; a microprocessor; and an input/output interface for data input and output. The storage medium, microprocessor and input/output interface are connected to one another so that data may be transferred between each of these. The data output consists of a display screen, which displays characters to an operator, and data input is performed by way of a keyboard and a mouse, or touch screen. The input/output interface is connected to a data acquisition connection, which receives data from routers, switches, and other network nodes regarding network traffic. The input/output interface also sends data that it receives from the keyboard, and data acquisition connection, to the storage medium to be stored for later use by the microprocessor. The microprocessor, in order to perform the method detailed below, retrieves stored data from the storage medium, and performs operations on the data using Gaussian and Gamma distribution functions, and applying a dimensioning formula, to produce a result. This result is sent to the input/output interface, which outputs the data to the display. This microprocessor-based system is not only applicable for network capacity planning, but for cable television and satellite traffic as well.

With reference to FIG. 1 and according to one embodiment of the present invention, the method for capacity planning and bandwidth provisioning for the voice-over IP (VoIP) portion of total traffic over cable systems or aggregations of digital subscriber line (DSL) data lines using observed or planned voice traffic levels comprises the following steps:

Voice Over Internet Protocol Bandwidth Calculator

The Voice over Internet Protocol Bandwidth Calculator enables telephone companies, cable companies, interne service providers, and business enterprises to plan, convert to and expand packet voice access networks. The calculator computes any one of the three quantities: access link bandwidth, the maximum number of subscribers, or the quality of service, when the other two quantities are known.

With reference to FIG. 1, the calculator uses a relationship between number of subscribers (numSub), the number of voice channels (numCh), which is further related to total bandwidth (BW), as explained below, and quality of service (QoS), which itself is related to the call blocking probability p below. The calculations are based on the following Gaussian model:

$$P\left(\frac{numCh - numSub * R_1 * R_2}{\sqrt{numSub * R_1 * R_2}} \geq x_p\right) = p$$

where $\Phi(x_p) = (1-p)$, with $\Phi$ being the standard Normal cumulative distribution function, $R_1$ and $R_2$ are two constants specified below.

The call blocking probability p is derived from a user input labeled as Quality of Service (QoS) with the formula p=1−QoS/100, except when the user enters the number of subscribers and the available bandwidth. In that case, the tool calculates the value of p. If numCh is not a whole number, it is changed to a whole number where indicated in the steps below. The required BW is then given by:

$$BW = numCh * BWPC * (1+R_3),$$

where $R_3$ is a constant specified below and BWPC denotes the required Bandwidth Per Active Voice Channel to be specified below.

In traditional telephony, planners use various provisioning models including Erlang B, Poisson, and the Gaussian model. The present embodiment implements the Gaussian model in the VoIP calculator due to its analytic simplicity, and conservative results (i.e., it usually provisions slightly more capacity than the others). In VoIP applications, it is desirable to reduce the risk of under-provisioning because congestion can impair voice quality.

In Step 10, the user of the VoIP (Voice over IP) Calculator is prompted to input the chosen voice codec and the voice packet payload duration in milliseconds. "Codec" is an abbreviation of coder/decoder. A VoIP codec converts analog voice signals into a digital bit stream, which is loaded into individual packets for transmission. At the receiving end, the codec converts the digital bit stream back into analog voice signals. The calculator offers the following four codec options:

G.711@10 ms
G.711@20 ms
G.729(A)@10 ms
G.729(A)@20 ms

G.711 is also known as Pulse Code Modulation, and it digitizes voice without compressing it. G.729(A), on the other hand, compresses voice to save bandwidth at the cost of some reduction in voice quality. The designations 10 ms and 20 ms indicate the voice sample duration in each VoIP packet. The combination of codec and packet duration determines BWPC in the following steps. BWPC values verified by lab measurement for G.711@10 ms, G.711@20 ms, G.729(A)@10 ms and G.729(A)@20 ms are 127.57, 96.37, 71.57 and 40.37 kbps (kilobits per second), respectively. They are converted into Mbps (megabits per second) by dividing by 1000.

In Step 20, the user of the VoIP Calculator is prompted to input the Average Busy Season busy hour load per VoIP subscriber (ABS) ($R_1$). This is the average voice traffic load expressed as the fraction of time in the busy hour that the subscriber uses the service. The busy hour is the time-consistent weekday hour with the highest average load during the three busiest months of the year. The ABS load per subscriber is between 0.0 and 1.0 erlang, which is the theoretical maximum possible value. A default ABS load of 0.1 and a range of 0.07 to 0.10 erlang per subscriber are suggested in the VoIP Calculator. These are based on typical values seen in field data and on values used by planners in the absence of field data. The erlang unit is a dimensionless quantity commonly used in telephony to represent the traffic load such that a single channel occupied for the whole busy hour carries a traffic load of 1.0 erlang. Traffic loads in Centi-call Seconds (CCS) or minutes of use must be converted into erlang loads before being entered into the tool. A load of 1 CCS converts into 1/36=0.027778 erlang, and 1 minute of usage converts into 1/60=0.016667 erlang.

In Step 30, the user of the VoIP Calculator is prompted to input the ratio of the high day load to the average busy season load (HD/ABS) ($R_2$). This HD load is defined as the estimated or actual busy hour load for the busiest day of the three busiest months in the year. The HD/ABS ratio is greater than 1.0 but has no theoretical maximum value. Accordingly, a default HD/ABS ratio value of 1.2 and a range of 1.1 to 1.3 are suggested by the calculator. These are based on typical values seen in field data and on values used by planners in the absence of field data.

In Step 40, the user of the VoIP Calculator is prompted to input the bandwidth overhead percentage. The overhead percentage $R_3$ must be set between 0% and 10%, and a default BW overhead percentage of 5% is suggested. It is very unlikely that a value greater than 10% would be needed so 10% is considered a practical maximum. Lab measurements of signaling requirements gave a total overhead of about 1% or less. This could increase with higher rates of feature usage and shorter call holding times. This signaling traffic is in band, so it travels along the same path as the voice packets. In addition, in order to avoid increasing packet jitter, which can degrade perceived voice quality, the calculator suggests that the user set the overhead conservatively at a level of 5%.

In Step 50, the tool user selects a quantity to be calculated, the calculator being capable of conducting any of the following three calculations:
  (i) Find the total required BW given the QoS and number of subscribers (numSub), described in Steps 60-90; or
  (ii) Find the QoS, given BW and numSub, described in Steps 100-130; or
  (iii) Find numSub, given BW and QoS, described in Steps 140-170.

In Step 60, having already chosen to calculate BW, the user enters the number of subscribers.

In Step 70, the user enters QoS expressed as a percentage between 0% and 100%. QoS is converted into the blocking probability p by means of the formula:

$$p=1-QoS/100.$$

In Step 80, bandwidth is computed using a Gaussian model, which consists of two substeps, Steps 81 and 82:
  In Step 81, given p and numSub, the required number of channels numCh is computed according to the formula:

$$numCh = numSub*R_1*R_2 + x_p*\sqrt{numSub*R_1*R_2}$$

If numCh is not a whole number, it is rounded-up to the next whole number.

In Step 82, the total bandwidth required is calculated using the formula:

$$BW = numCh*BWPC*(1+R_3)$$

According to Step 90, the resulting bandwidth BW, expressed in megabits per second (Mbps), is displayed to the user.

In Step 100, having already chosen to calculate QoS, the user inputs the number of subscribers, numSub.

In Step 110, the user also inputs the bandwidth BW in Mbps.

Step 120 computes the QoS using the input parameters, and consists of three substeps, Steps 121, 122 and 123:

Step 121 involves converting BW into number of channels according to the formula:

$$numCH = (BW/BWPC)/(1+R_3).$$

If numCh is not a whole number, it is rounded down to the next whole number.

In Step 122, the blocking probability p is given by:

$$p = 1 - \Phi\left(\frac{numCh - numSub*R_1*R_2}{\sqrt{numSub*R_1*R_2}}\right)$$

In Step 123, the blocking probability p is converted into QoS using the formula:

$$QoS = (1-p)*100.$$

In Step 130, the resulting quality of service expressed as a percentage is displayed to the tool user.

In Step 140, having already chosen to calculate the number of subscribers, the user inputs the total bandwidth BW.

In Step 150 the user also enters the QoS. QoS is converted into the blocking probability p using the formula:

$$p=1-QoS/100.$$

In Step 160, using a Gaussian model the VoIP calculator computes the number of subscribers that can be supported, given the input parameters. It consists of two substeps, Steps 161 and 162:

In Step 161, for the given BW and blocking probability p, first compute $x_p$ and then numCh as follows:

$$x_p = \Phi^{-1}(1-p),$$

$$numCh = (BW/BWPC)/(1+R_3).$$

If numCh is not a whole number, it is rounded down to the next whole number.

In Step 162, the number of subscribers, numSub, is computed using the formula:

$$numSub = \frac{2*numCh + x_p^2 - x_p\sqrt{4*numCh + x_p^2}}{2*R_1*R_2}$$

If numSub is not a whole number, it is rounded down to the next whole number.

In Step 170, the resulting number of subscribers is displayed.

Voice and Data Calculator

With reference to FIG. 2, the Voice and Data Calculator enables cable companies, internet service providers, and business enterprises to plan, convert and expand the capacity of their access networks that provide Voice over Internet Protocol (VoIP) and high speed internet services. The calculator is capable of computing required bandwidth BW or numbers of subscribers for both VoIP and High Speed Data Traffic (HSDT) subscribers for given profiles of VoIP and HSDT subscribers.

At Step 210, the user of the Voice and Data Calculator inputs the chosen voice codec and the voice packet payload duration in milliseconds, the calculator offers the following four codec options:
  G.711@10 ms
  G.711@20 ms
  G.729(A)@10 ms
  G.729(A)@20 ms G.711 is also known as Pulse Code Modulation, and it digitizes voice without compressing it. G.729(A), on the other hand, compresses voice to save bandwidth at the cost of some reduction in voice quality. The designations 10 ms and 20 ms indicate the voice sample duration in each VoIP packet. The combination of codec and packet duration determines BWPC in the following steps. BWPC values verified by lab measurement for G.711@10 ms, G.711@20 ms, G.729(A)@10 ms and G.729(A)@20 ms are 127.57, 96.37, 71.57 and 40.37 kbps (kilobits per second), respectively. They are converted into Mbps (megabits per second) by dividing by 1000.

In Step 220, the user inputs the ABS, denoted by $R_1$. The ABS voice load per subscriber is between 0.0 and 1.0 erlang, which is the theoretical maximum possible value. A default ABS load of 0.1 and a range of 0.07 to 0.10 erlang per subscriber are suggested in the VoIP Calculator. These are based on typical values seen in field data and on values used by planners in the absence of field data.

In Step 230, the user of the Voice and Data Calculator inputs the HD/ABS voice load ratio denoted by $R_2$. The HD/ABS ratio is greater than 1.0 but has no theoretical maximum value. Accordingly, a default HD/ABS ratio value of 1.2 and a range of 1.1 to 1.3 are suggested by the calculator. These are based on typical values seen in field data and on values used by planners in the absence of field data.

In Step 240, the user of the Voice and Data Calculator is prompted to input the voice bandwidth overhead percentage denoted by $R_3$. The overhead percentage $R_3$ must be set between 0% and 10%, and a default BW overhead percentage of 5% is suggested. Lab measurements of signaling requirements gave a total overhead of about 1% or less. In order to avoid increasing packet jitter, which can degrade perceived voice quality, the calculator suggests that the user set the overhead conservatively at a level of 5%.

In Step 250, the user inputs the QoS expressed as a percentage between 0% and 100%, which is related to the voice blocking probability p by the formula p=1−QoS/100.

In Step 260, the user inputs the access rate for HSDT subscribers. This fixed quantity is defined as the peak transfer rate (commonly called 'speed') of the access connection expressed in Mbps that the ISP provides to a subscriber. There is no single typical value for the peak transfer rate because it depends on several factors such as access technology (DSL or cable), DOCSIS version in cable systems, and the nature and quality of underlying physical media supporting the service. Currently, values of the peak access rate often lie in the range from about 0.5 to 10 Mbps. This range may change in the future, but the tool accommodates, without any modification required, whatever value applies at the time of calculation.

In Step 270, the user of the Voice and Data Calculator inputs the demand, which is defined as the percentage of the access rate that a subscriber is actually using. The demand depends on the actual network traffic and can be calculated from real traffic statistics; 2 percent of demand is suggested by the calculator based on some experimental results from ISPs. In real networks, a user is not active (using the Internet) all the time; moreover, the traffic generated by an active user appears in bursts, which can be modeled as an on/off process. Here the demand reflects this fact, and the values of demand may be between 0 and 100.

In Step 280, the user of the Voice and Data Calculator inputs the desired data traffic QoS, denoted by $QoS_d$, for HSDT subscribers. The QoS represents the percentage of the access rate the ISP can actually offer assuming all subscribers are making full use of the service at the same time.

In Step 290, the tool user specifies the quantity that is to be calculated. The calculator is capable of conducting either of the following two calculations:
  (i) Find the total required BW given the numbers of VoIP and HSDT subscribers, as described in Steps 300-370; or
  (ii) Find the numbers of VoIP and HSDT subscribers given BW and QoS requirements, as described in Steps 380-450.

In Step 300, having already chosen to calculate BW, the user of the Voice and Data Calculator enters the number of VoIP subscribers, $numSub_v$.

In Step 310, the tool user enters the number of HDST subscribers, $numSub_d$.

In Step 320, Bandwidth for voice over IP is computed using a Gaussian model, which consists of two substeps, Step 321 and Step 322:

In Step 321, given p and $numSub_v$, the required number of voice channels $numCh_v$ is calculated using the following formula:

$$numCh_v = numSub_v * R * R_2 + X_p * \sqrt{numSub_v * R_1 * R_2}.$$

If $numCh_v$ is not a whole number, it is rounded up to the next whole number.

In Step 322, the total bandwidth BW, required by VoIP service is calculated using the formula:

$$BW_v = numCh_v * BWPC * (1+R_3).$$

In Step 330, the required bandwidth $BW_d$ required for HSDT service is calculated using the formula:

$$BW_d = numSub_d/(1/a + 1/d - 1/c),$$

where a is the offered traffic, d is the useful rate, and c is the access rate. The offered traffic is the average data rate a subscriber generates when there is no congestion. The offered traffic is related to the demand parameter and calculated by using the formula $$a = c * \text{demand}.$$

The useful rate is defined as the ratio of the mean flow volume and the mean duration.
The useful rate is related to the quality of service and calculated by means of the formula $$d = c * QoS_d.$$

In Step 340, the bandwidth for VoIP BW, and the bandwidth for data traffic $BW_d$ are added together in order to obtain the total bandwidth.

In Step 350, the resulting bandwidth $BW_v$ for VoIP (expressed in Mbps) is displayed.

In Step 360, the resulting bandwidth $BW_d$ for data traffic (expressed in Mbps) is displayed.

In Step 370, the total bandwidth calculated by means of $BW = BW_v + BW_d$, expressed in Mbps, is displayed.

In Step 380, having already chosen to compute the number of subscribers, the user of the Voice and Data Calculator inputs the amount of bandwidth $BW_v$ available for VoIP.

In Step 390, the user inputs the bandwidth $BW_d$ available for data traffic.

In Step 400, the VoIP calculator uses a Gaussian model to compute the number of voice subscribers that can be supported, given the input parameters for VoIP. It consists of two substeps, Steps 401 and 402:

In Step 401, for the given blocking probability p, $x_p$ is first computed, and then the number of voice channels, $numCh_v$, is computed as follows, with $\Phi$ being the standard Normal cumulative distribution:

$$x_p = \Phi^{-1}(1-p),$$

$$numCh_v = (BW_v/BWPC)/(1+R_3).$$

If numCh, is not a whole number, it is rounded down to the next whole number.

In Step 402, the number of subscribers, $numSub_v$, is computed as follows:

$$numSub_v = \frac{2 * numCh_v + x_p^2 - x_p \sqrt{4 * numCh_v + x_p^2}}{2 * R_1 * R_2}$$

If $numSub_v$ is not a whole number, it is rounded down to the next whole number.

In Step 410, the number of HSDT subscribers, $numSub_d$, is calculated using the dimensioning formula:

$$numSub_d = BW_d * (1/a + 1/d - 1/c),$$

where a is the offered traffic, d is the useful rate and c is the access rate.

In Step 420, the number of subscribers for VoIP and the number of subscribers for data traffic are added together in order to obtain the total number of subscribers.

In Step 430, the resulting number of subscribers for VoIP is displayed.

In Step 440, the resulting number of subscribers for data traffic is displayed.

In Step 450, the resulting total number of subscribers for both VoIP and data traffic is displayed.

Voice and Traffic Based Data Calculator

With reference to FIG. 3, the Voice and Traffic Based Data Calculator enables Internet Service Providers (ISPs) to plan and expand their voice and data access network capacities based on modeling of real network traffic. The user of the calculator can choose built-in traffic models fitted to typical traffic traces or build a model from a real data traffic trace provided by the tool user. The calculator computes one of the two quantities, either access link bandwidth BW, or the maximum numbers of VoIP subscribers and high speed data traffic subscribers, respectively, when the available bandwidths $BW_v$ for voice and $BW_d$ for data are known.

The general process of the data traffic calculations is as follows: fit a traffic trace for $N_0$ subscribers by a Gamma model $\Gamma(\alpha_0, \theta_0)$. Then conduct the network capacity planning by assuming the traffic generated by a different number N of subscribers (but with similar usage patterns) has the related Gamma distribution $\Gamma(\alpha_0 *HD/ABS*N/N_0, \theta_0)$.

To dimension VoIP traffic, the calculator uses a relationship between number of voice subscribers (numSub$_v$), the number of voice channels (numCh$_v$), which is further related to bandwidth (BW$_v$) as explained below, and quality of service (QoS), which is related to the call blocking probability p by the formula p=1−QoS/100. The calculations are based on the following Gaussian model:

$$P\left(\frac{numCh_v - numSub_v * R_1 * R_2}{\sqrt{numSub_v * R_1 * R_2}} \geq x_p\right) = p$$

where $\Phi(x_p)=(1-p)$, with $\Phi$ being the standard Normal cumulative distribution function, and $R_1$ and $R_2$ are two constants specified below.

The call blocking probability p is derived from a user input labeled as Quality of Service (QoS) with the formula:

$p=1-QoS/100$.

If numCh$_v$ is not a whole number, it is changed to a whole number as indicated in the steps below. The required BW$_v$ is then given by the formula:

$BW_v = numCh_v * BWPC * (1+R_3)$, where $R_3$ is a constant specified below and BWPC denotes the bandwidth per channel, which depends on the coder/decoder (codec) algorithm of the VoIP device.

In traditional telephony, planners use various provisioning models including Erlang B, Poisson, and the Gaussian model. The present embodiment implements the Gaussian model in the VoIP calculator because it is analytically simple and somewhat conservative (i.e., it usually provisions slightly more capacity than the others). In VoIP applications, it is desirable to reduce the risk of underprovisioning because congestion can impair voice quality.

In Step 510, the user of the Voice and Traffic Based Data Calculator inputs the chosen voice codec and the voice packet payload duration in milliseconds. The calculator offers the following four codec options:

G.711@10 ms
G.711@20 ms
G.729(A)@10 ms
G.729(A)@20 ms

G.711 is also known as Pulse Code Modulation, and it digitizes voice without compressing it. G.729(A), on the other hand, compresses voice to save bandwidth at the cost of some reduction in voice quality. The designations 10 ms and 20 ms indicate the voice sample duration in each VoIP packet. The combination of codec and packet duration determines BWPC in the following steps. BWPC values verified by lab measurement for G.711@10 ms, G.711@20 ms, G.729(A)@10 ms and G.729(A)@20 ms are 127.57, 96.37, 71.57 and 40.37 kbps (kilobits per second), respectively. They are converted into Mbps (megabits per second) by dividing by 1000.

In Step 520, the user of the Voice and Traffic Based Data Calculator inputs the ABS voice load ($R_1$) in erlang. The ABS load per subscriber is between 0.0 and 1.0 erlang, which is the theoretical maximum possible value. A default ABS load of 0.1 and a range of 0.07 to 0.10 erlang per subscriber are suggested in the VoIP Calculator. These are based on typical values seen in field data and on values used by planners in the absence of field data.

In Step 530, the user of the Voice and Traffic Based Data Calculator inputs the HD/ABS ($R_2$) ratio. The HD/ABS ratio is greater than 1.0 but has no theoretical maximum value. Observed values often lie in the range 1.1 to 1.3. A default HD/ABS ratio value of 1.2 and a range of 1.1 to 1.3 are suggested by the Calculator. These values are also based on typical values seen in field data and on values used by planners in the absence of field data.

In Step 540, the user of the Voice and Traffic Based data Calculator inputs the bandwidth overhead percentage. The overhead percentage $R_3$ must be set between 0% and 10%, and a default BW overhead percentage of 5% is suggested. Lab measurements of signaling requirements gave a total overhead of about 1% or less. In order to avoid increasing packet jitter, which can degrade perceived voice quality, the calculator suggests that the user set the overhead conservatively at a level of 5%.

In Step 550, the user of the Voice and Traffic Based Data Calculator inputs the QoS for VoIP expressed as a percentage between 0% and 100%. The QoS of VoIP is converted into blocking probability p by means of the formula:

$p=1-QoS/100$.

In Step 560, the user inputs HD/ABS, the ratio of the high day load and the average busy season load for data traffic.

In Step 570, the user of the Voice and Traffic Based Data Calculator inputs the QoS of data traffic expressed as a percentage between 0% and 100%, which is related to the allowable blocking probability p by the formula p=1−QoS/100.

In Step 580, the user of the Voice and Traffic Based Data calculator specifies which model to use for bandwidth provisioning of the data traffic. The user chooses the default model or selects a model by means of the model selection module of the calculator. If the user selects the default model, then proceed directly to Step 600.

If the user selects a different model, then in step 590 the calculator launches the model selection module, which is described below. On selection of the model, the process enters into Step 600.

In Step 600, having already chosen the model to use for data traffic provisioning, the tool user specifies what quantity is to be calculated. The calculator is capable of conducting two calculations, one of which may be selected by the user:

(i) find the total required BW given the numbers of VoIP and data subscribers, denoted by numSub$_v$ and numSub$_d$, as described in Steps 610-680; and (ii) find the maximal numbers of VoIP and data subscribers given BW broken down into BW$_v$ for VoIP subscribers and BW$_d$ for data subscribers, as described in Steps 690-760.

In Step 610, having already chosen to calculate BW, the user of the Voice and Traffic Based Data Calculator enters the number of subscribers for voice over IP, $numSub_v$.

In Step 620, the tool user then enters the number of subscribers for data traffic, $numSub_d$.

In Step 630, bandwidth for voice over IP $BW_v$ is computed using a Gaussian model, which consists of two substeps, Steps 631 and 632:

In Step 631, given p and $numSub_v$, the calculator computes the required number of voice channels $numCh_v$ using the formula:

$$numCh_v = numSub_v * R_1 * R_2 + X_p * \sqrt{numSub_v * R_1 * R_2}.$$

If $numCh_v$ is not a whole number, it is rounded up to the next whole number.

In Step 632, the calculator calculates the required bandwidth $BW_v$ using the formula:

$$BW_v = numCh_v * BWPC * (1+R_3).$$

In Step 640, the amount of bandwidth required by data traffic, $BW_d$, is computed by using the formula:

$$BW_d = \Gamma^{-1}(1-p, \alpha_0 * numSub_d * HD/ABS/N_0, \theta_0),$$

where $\Gamma^{-1}$ is the inverse function of the Gamma distribution function, p is blocking probability, $\alpha_0$ and $\theta_0$ are the parameters of the default Gamma model, and $N_0$ is the number of subscribers that generated the default traffic trace.

In Step 650, the bandwidth for VoIP $BW_v$ and the bandwidth for data traffic $BW_d$ are added together in order to obtain the total bandwidth, BW.

In Step 660, the resulting bandwidth $BW_v$ for VoIP (expressed in Mbps) is displayed.

In Step 670, the resulting bandwidth $BW_d$ for data traffic (expressed in Mbps) is displayed.

In Step 680, the resulting total bandwidth BW is displayed.

In Step 690, having already chosen to compute the numbers of subscribers, the user of the Voice and Traffic Based Data Calculator inputs the bandwidth $BW_v$ available for VoIP.

In Step 700, the user inputs the bandwidth $BW_d$ available for data traffic.

In Step 710, using the Gaussian model, the calculator computes the maximal number of VoIP subscribers that can be supported with the given input parameters. It consists of two substeps, Steps 711 and 712:

In Step 711, for the given $BW_v$ and blocking probability p, the calculator first computes $x_p$ and then computes the number of voice channels, $numCh_v$, using the following formula, with $\Phi$ being the standard Normal cumulative distribution:

$$x_p = \Phi^{-1}(1-p),$$

$$numCh_v = (BW_v/BWPC)/(1+R_3).$$

If $numCh_v$ is not a whole number, it is rounded down to the next whole number.

In Step 712, the number of VoIP subscribers $numSub_v$ is computed by using the formula $$numSub_v = \frac{2*numCh_v + x_p^2 - x_p\sqrt{4*numCh_v + x_p^2}}{2*R_1*R_2}$$

If numSub is not a whole number, it is rounded down to the next whole number.

In Step 720, the calculator computes the number of data subscribers, $numSub_d$, by one-dimensional search, that is, by finding the largest positive integer n such that $$\Gamma(BW_d, \alpha_0 * n * HD/ABS/N_0, \theta_0) < 1-p.$$

In Step 730, the number of subscribers for VoIP and the number of subscribers for data traffic are added together in order to obtain the total number of subscribers.

In Step 740, the resulting number of subscribers for VoIP $numSub_v$ is displayed.

In Step 750, the resulting number of subscribers for data traffic $numSub_d$ is displayed.

In Step 760, the resulting total number of subscribers for both VoIP and data traffic is displayed.

Multi-Codec Voice Over IP (MC-VoIP) Calculator

The Multi-Codec Voice over IP (MC-VoIP) Calculator, as shown in FIG. 4, enables telephone companies, cable companies, internet service providers, and business enterprises to plan, convert into and expand packet voice access networks that provide VoIP services with various codec devices. For a given number of subscriber groups, the calculator computes either of the two quantities: access link bandwidth or the quality of service, when the other quantity is known.

Each subscriber group is described by number of subscribers (numSub), codec which defines the bandwidth per channel (BWPC), Average Busy Season busy hour load per VoIP subscriber (ABS), and the ratio of the high day load to the average busy season load (HD/ABS). The calculator uses a relationship between total bandwidth (BW) and quality of service (QoS), related to the call blocking probability p by the formula p=1−QoS/100. Assuming n groups of subscribers, the calculations are based on the following Gaussian model:

$$P\left(\frac{BW - \sum_{k=1}^{n} numSub_k * H_k * R_k * BWPC_k * (1+R)}{\sqrt{\sum_{k=1}^{n} numSub_k * H_k * R_k * BWPC_k * (1+R)}} \geq x_p\right) = p$$

where $\Phi(x_p)=(1-p)$, with $\Phi$ being the standard Normal cumulative distribution function, R is a constant denoting the percentage of overhead; $numSub_k$, $H_k$, $R_k$, and $BWPC_k$ denote, respectively, the number of subscribers, ABS rate, HD/ABS and BWPC of group k.

The user of the Multi-Codec Voice over IP Calculator creates user group profiles described by Step 810 to Step 860. The calculator then uses the above dimensioning formula to compute BW or QoS, as chosen by the tool user.

In Step 810, the user of the MC-VoIP (Voice over IP) calculator inputs the number of subscribers.

In Step 820, the user of the MC-VoIP Calculator chooses the voice codec and the voice packet payload duration in milliseconds used by the group. A VoIP codec converts analog voice signals into a digital bit stream for transmission. At the receiving end, the codec converts the digital bit stream back into analog voice signals. The calculator offers the following four codec options:

G.711@10 ms
G.711@20 ms
G.729(A)@10 ms
G.729(A)@20 ms

G.711 is also known as Pulse Code Modulation, and it digitizes voice without compressing it. G.729(A), on the other hand, compresses voice to save bandwidth at the cost of some reduction in voice quality. The designations 10 ms and 20 ms indicate the voice sample duration in each VoIP packet. The combination of codec and packet duration determines BWPC in the following steps. BWPC values verified by lab measurement for G.711@10 ms, G.711@20 ms, G.729(A) @10 ms and G.729(A)@20 ms are 127.57, 96.37, 71.57 and 40.37 kbps (kilobits per second), respectively. They are converted into Mbps (megabits per second) by dividing by 1000.

In Step 830 the user of the MC-VoIP Calculator inputs the ABS of the group. The ABS load per subscriber is between 0.0 and 1.0 erlang, which is the theoretical maximum possible value. A default ABS load of 0.1 and a range of 0.07 to 0.10 erlang per subscriber are suggested in the MC-VoIP Calculator. These are based on typical values seen in field data and on values used by planners in the absence of field data.

In Step 840, the user of the MC-VoIP Calculator inputs the HD/ABS ratio. The HD/ABS ratio is greater than 1.0 but has no theoretical maximum value. Accordingly, a default HD/ABS ratio value of 1.2 and a range of 1.1 to 1.3 are suggested by the calculator. These are based on typical values seen in field data and on values used by planners in the absence of field data.

In Step 850, the new subscriber group is created and listed in a text field.

In Step 860, the MC-VoIP calculator user chooses whether another subscriber group is needed. If the user selects yes, repeat Step 810 to Step 850 to create a new group, otherwise proceed to step 870.

In Step 870, the user of the MC-VoIP Calculator inputs the bandwidth overhead percentage. The overhead percentage $R_3$ must be set between 0% and 10%, and a default BW overhead percentage of 5% is suggested. Lab measurements of signaling requirements gave a total overhead of about 1% or less. In order to avoid increasing packet jitter, which can degrade perceived voice quality, the calculator suggests that the user set the overhead conservatively at a level of 5%.

In Step 880, the tool user specifies what quantity is to be calculated. The calculator is capable of conducting either of the following two calculations:

(i) Find the total required BW given the QoS and subscriber group profiles, as described in Step 890 to Step 910; or (ii) Find the QoS, given BW and subscriber group profiles, described in Steps 920-940.

In Step 890, having already chosen to calculate BW, the MC-VoIP Calculator user enters the QoS expressed as a percentage between 0% and 100%, from which the blocking probability p is calculated using the formula p=1−QoS/100.

In Step 900, bandwidth is computed using a Gaussian model, which consists of two substeps, Steps 901 and 902:

In Step 901, with the blocking probability p, and Φ being the standard Normal cumulative distribution, the calculator computes $$x_p = \Phi^{-1}(1-p).$$

In Step 902, the calculator computes BW by the following formula:

$$BW = \sum_{k=1}^{n} numSub_k * H_k * R_k * BWPC_k * (1+R) + x_p * \sqrt{\sum_{k=1}^{n} numSub_k * H_k * R_k * BWPC_k * (1+R)}.$$

In Step 910, the resulting bandwidth BW (expressed in Mbps) is displayed.

In Step 920, having already chosen to compute QoS, the MC-VoIP Calculator user inputs the available bandwidth BW.

In Step 930, the blocking probability p is given by $$p = 1 - \Phi\left(\frac{BW - \sum_{k=1}^{n} numSub_k * H_k * R_k * BWPC_k * (1+R)}{\sqrt{\sum_{k=1}^{n} numSub_k * H_k * R_k * BWPC_k * (1+R)}}\right)$$

The related QoS expressed as a percentage is found with the formula QoS=(1−p)*100.

In Step 940, the resulting quality of service is displayed.

High Speed Data Traffic (HSDT) Dimensioning Calculator

With reference to FIG. 5, the high speed data traffic (HSDT) dimensioning calculator enables high speed Internet Service Providers (ISPs) to plan and expand their access network capacity. The HSDT calculator computes the relationship between the bandwidth (BW) expressed in Mbps, quality of service (QoS) to be defined below, and the number of subscribers numSub. The number of subscribers designates the number of residential and business high speed internet accounts currently served, or expected to be served, on the ISP's access network facilities that are being planned. The HSDT calculator computes any one of the three quantities: BW, QoS and numSub, when the other two are given.

In Step 1010, the user of the HSDT Calculator inputs the access rate for HSDT subscribers. This fixed quantity is defined as the peak transfer rate (commonly called 'speed') of the internet access connection expressed in Mbps that the ISP provides to a subscriber. There is no single typical value for the peak transfer rate because it depends on several factors such as access technology (DSL or cable), DOCSIS version in cable systems, and the nature and quality of underlying physical media supporting the service. Currently, values of the peak access rate often lie in the range from about 0.5 to 10 Mbps. This range may change in the future but the tool accommodates, without any modification required, whatever value applies at the time of calculation.

In Step 1020, the user inputs the demand, which is defined as the percentage of the access rate that a subscriber is actually using, a value between 0 and 100. The value suggested by the calculator is 2% but the typical value may vary from one network to another. The demand depends on the actual network traffic and can be calculated from real traffic statistics; the suggested value 2% is based on some experimental results from ISPs. It reflects the fact that in real networks, a user is not active (i.e. using the Internet) all the time; moreover, the traffic generated by an active user appears in bursts, which may be modeled as an on/off process.

In Step 1030, the user of the HSDT Calculator chooses what quantity to calculate. The calculator is capable of conducting any of the following three calculations:

(i) Find the required BW given the number of subscribers numSub and QoS, which represents the percentage of the access rate the ISP can actually offer assuming all active subscribers are making full usage of the service at the same time, as described in Steps 1040-1070;

(ii) Find QoS given the amount of bandwidth BW and number of subscribers numSub, as described in Steps 1080-1110; or (iii) Find the number of subscribers numSub, given the amount of available bandwidth BW and QoS, described in Steps 1120-1150.

In Step 1040, having already chosen to calculate BW, the HSDT Calculator user inputs the desired QoS.

In Step 1050, the HSDT Calculator user inputs the number of subscribers, numSub.

In Step 1060, the required bandwidth BW is calculated using the formula $$BW = numSub/(1/a + 1/d - 1/c),$$

where a is the offered traffic, d is the useful rate, and c is the access rate. The offered traffic is the average data rate a user generates when there is no congestion, and is related to the demand parameter by means of the relation $$a = c*\text{demand}.$$

The useful rate is defined as the ratio of the mean flow volume and the mean duration, and is related to the quality of service through the relation $$d = c*QoS.$$

In Step 1070, the calculated bandwidth BW expressed in Mbps is displayed.

In Step 1080, having already chosen to calculate QoS, the HSDT Calculator user inputs the amount of bandwidth BW in Mbps.

In Step 1090, the HSDT Calculator user inputs the number of subscribers, numSub.

In Step 1100, the QoS is computed and consists of two substeps, Steps 1101 and 1102:

In Step 1101, given the offered traffic a and access rate c, compute the useful rate using the formula $$d = 1/(numSub/BW - 1/a + 1/c).$$

In Step 1102, compute the QoS given the useful rate d and access rate c by $$QoS = d/c.$$

In Step 1110, the calculated QoS, expressed as a percentage, is displayed.

In Step 1120, having already chosen to calculate the number of subscribers, numSub, the HDST Calculator user inputs the amount of available bandwidth BW expressed in Mbps.

In Step 1130, the user inputs the desired QoS, which represents the percentage of the access rate the ISP can actually offer assuming all the subscribers are simultaneously making full usage of the service.

In Step 1140 the number of subscribers, numSub, is calculated using the dimensioning formula $$numSub = BW*(1/a + 1/d - 1/c),$$

where a is the offered traffic, d the useful rate and c is the access rate.

In Step 1150, the calculated number of subscribers is displayed.

Multi-Group High Speed Data Traffic (MG-HSDT) Calculator

With reference to FIG. 6, the multi-group high speed data traffic (MG-HSDT) calculator enables Internet Service Providers (ISPs) to plan and expand the capacities of their networks that support diverse service requirements. For given groups of subscribers with different service requirements, this calculator computes either the quality of service (QoS) or required bandwidth (BW) expressed in Mbps, if the other one is given. To conduct the calculations, the user of the MG-HSDT Calculator must input the access rate, which is defined as the speed in Mbps that the ISP provides to a customer.

The first function of the MG-HSDT Calculator is to create profiles of subscriber groups, as described in Steps 1210-1240. In Step 1210, to create a new subscriber group, the user inputs the number of subscribers in the group.

In Step 1220, the user of the MG-HSDT Calculator inputs the demand of the subscriber group. The demand depends on the actual network traffic and can be calculated from real traffic statistics; 2 percent of demand is suggested by the calculator based on experimental results from ISPs. In real networks, a user is not active (using the Internet) all the time; moreover, the traffic generated by an active user appears in bursts, which can be modeled as an on/off process. Here the demand reflects this fact, and the values of demand may be between 0 and 100.

In Step 1230, a subscriber group is created and added to the list of subscriber groups.

In Step 1240, the user decides if there are more groups to create. If more groups are to be defined, the user must repeat Steps 1210-1230, otherwise proceed to step 1250.

In Step 1250, the user inputs the access rate.

In Step 1260, the user chooses which quantity to compute. The MG-HSDT Calculator is capable of conducting either of the following two calculations:

(i) Find the required bandwidth BW given quality of service (QoS), described in Step 1270 to Step 1290; or (ii) find the achievable QoS given the amount of available bandwidth BW, as described in Step 1300 to Step 1320.

The QoS represents the percentage of the access rate the ISP can actually offer assuming all subscribers are making full use of the service at the same time.

In Step 1270, having already chosen to compute BW, the MG-HSDT Calculator user inputs the desired QoS.

In Step 1280, assuming that there are n user groups defined, the required BW is computed using the formula:

$$BW = \sum_{k=1}^{n} \frac{N_k}{\frac{1}{a_k} + \frac{1}{d} - \frac{1}{c}}$$

where $N_k$ is the number of subscribers in group k, $a_k$ is the offered traffic of a subscriber in group k, d is the useful rate, and c is the access rate. The offered traffic is the average data rate a user could generate if there is no congestion. The offered traffic of group k is calculated by $$a_k = c*dmnd_k,$$

where $dmnd_k$ denotes the demand of a subscriber in group k. The useful rate d is defined as the ratio of the mean flow volume to the mean duration. The useful rate is calculated by $$d = c*QoS.$$

In Step 1290, the calculated bandwidth BW expressed in Mbps is displayed.

In Step 1300, having already chosen to compute QoS, the user of the MG-HSDT Calculator inputs the amount of bandwidth BW.

In Step 1310, the MG-HSDT Calculator computes the quality of service, QoS, by one-dimensional search, starting at 0.0001 and with step size 0.0001. At each step, the formula $$B = \sum_{k=1}^{n} \frac{N_k}{\frac{1}{a_k} + \frac{1}{d} - \frac{1}{c}}$$

is used to determine the amount of bandwidth B required to achieve the QoS of the current step, where $N_k$ is the number of subscribers in group k, $a_k$ is the offered traffic of group k computed by $a_k = c*dmnd_k$, d is the useful rate calculated by $d = c*QoS$, c is the access rate, and B is the required bandwidth to achieve the QoS at the current step.

This process stops when the required bandwidth B is greater than or equal to the available bandwidth BW.

In Step 1320, the calculated quality of service is displayed.

Multi-Group Voice and Data Calculator

With reference to FIG. 7, the multi-group voice and data calculator enables Internet Service Providers (ISPs) to plan and expand their network capacities. For given groups of subscribers with different service requirements, this calculator computes the required bandwidth (BW) expressed in Mbps. The calculator first creates profiles for voice over IP (VoIP) subscriber groups and data subscriber groups, and then applies dimensioning formulas to compute the required bandwidth.

In Step 1410, to create a new VoIP subscriber group, the user inputs the number of subscribers in the VoIP group.

In Step 1420, the user of the Multi-Group Voice and Data Calculator inputs the chosen voice codec and the voice packet payload duration in milliseconds used by the VoIP group. The calculator offers the following four codec options:

G.711@10 ms
G.711@20 ms
G.729(A)@10 ms
G.729(A)@20 ms

This calculator performs calculations for only one codec at a time.

G.711 is also known as Pulse Code Modulation, and it digitizes voice without compressing it. G.729(A), on the other hand, compresses voice to save bandwidth at the cost of some reduction in voice quality. The designations 10 ms and 20 ms indicate the voice sample duration in each VoIP packet. The combination of codec and packet duration determines BWPC in the following steps. BWPC values verified by lab measurement for G.711@10 ms, G.711@20 ms, G.729(A)@10 ms and G.729(A)@20 ms are 127.57, 96.37, 71.57 and 40.37 kbps (kilobits per second), respectively. They are converted into Mbps (megabits per second) by dividing by 1000.

In Step 1430, the user of the Multi-Group Voice and Data Calculator inputs the ABS of the group. The ABS load per subscriber is between 0.0 and 1.0 erlang, which is the theoretical maximum possible value. A default ABS load of 0.1 and a range of 0.07 to 0.10 erlang per subscriber are suggested in the VoIP Calculator. These are based on typical values seen in field data and on values used by planners in the absence of field data.

In Step 1440, the calculator user inputs the HD/ABS ratio. The HD/ABS ratio is greater than 1.0 but has no theoretical maximum value. Accordingly, a default HD/ABS ratio value of 1.2 and a range of 1.1 to 1.3 are suggested by the calculator. These suggestions are based on typical values seen in field data and on values used by planners in the absence of field data.

In Step 1450, the new subscriber group is created and listed in a text field.

In Step 1460, the calculator user specifies if another VoIP subscriber group is needed. If the user selects yes, repeat Steps 1410-1450 to create a new group, otherwise proceed to the next step.

In Step 1470, the user of the calculator is prompted to input the number of data subscribers in the group to be created.

In Step 1480, the user of the calculator inputs the demand of the subscriber group. The demand depends on the actual network traffic and can be calculated from real traffic statistics; 2 percent of demand is suggested by the calculator based on some experimental results from ISPs. In real networks, a user is not active (using the Internet) all the time; moreover, the traffic generated by an active user appears in bursts, which can be modeled as an on/off process. Here the demand reflects this fact, and the values of demand may be between 0 and 100.

In Step 1490, a subscriber group is created and added to the list of subscriber groups.

In Step 1500, the Multi-Group Voice and Data Calculator user specifies if there are more data subscriber groups to create. If more groups are to be defined, repeat Steps 1470-1490, otherwise proceed to the next step.

In Step 1510, the user of the calculator is prompted to input the voice bandwidth overhead percentage. The overhead percentage $R_3$ must be set between 0% and 10%, and a default BW overhead percentage of 5% is suggested. Lab measurements of signaling requirements gave a total overhead of about 1% or less. In order to avoid increasing packet jitter, which can degrade perceived voice quality, the calculator suggests that the user set the overhead conservatively at a level of 5%.

In Step 1520, the tool prompts the user to enter QoS as a percentage between 0% and 100%. QoS is converted into the blocking probability p by the formula:

$$p = 1 - QoS/100.$$

In Step 1530, the user inputs the access rate, which is defined as the speed in Mbps that the ISP provides a customer.

In Step 1540, the user inputs the desired QoS, which is defined as the percentage of the access rate the ISP can actually offer assuming all subscribers are making full use of the service at the same time.

In Step 1550, bandwidth is computed using a Gaussian model, which consists of two substeps, Steps 1551 and 1552:

In Step 1551, with the blocking probability p, compute $x_p = \Phi^{-1}(1-p)$ where $\Phi$ is the standard Normal cumulative distribution function.

In Step 1552, let $n_v$ denote the number of VoIP subscriber groups, compute BW by $$BW_v = \sum_{k=1}^{n_v} numSub_k * H_k * R_k * BWPC_k * (1+R) + x_p * \sqrt{\sum_{k=1}^{n_v} numSub_k * H_k * R_k * BWPC_k * (1+R)}.$$

where R is a constant denoting the percentage of overhead; $numSub_k$, $H_k$, $R_k$, and $BWPC_k$ denote, respectively, the number of subscribers, ABS rate, HD/ABS and BWPC of group k.

In Step 1560, assuming that there are $n_d$ interne data subscriber groups defined, the required $BW_d$ is computed using the formula:

$$BW_d = \sum_{k=1}^{n_d} \frac{N_k}{\frac{1}{a_k} + \frac{1}{d} - \frac{1}{c}}$$

where $N_k$ is the number of subscribers in group k, $a_k$ is the offered traffic of a subscriber in group k, d is the useful rate, and c is the access rate. The offered traffic is the average data rate an active subscriber could generate if there is no congestion. The offered traffic of group k is calculated by $$a_k = c * dmnd_k,$$

where $dmnd_k$ denotes the demand of a subscriber in group k. The useful rate d is defined as the ratio of the mean flow volume and the mean duration. The useful rate is calculated using:

$$d = c * QoS.$$

In Step 1570, the required total bandwidth BW is computed by $BW = BW_v + BW_d$.

In Step 1580, the required bandwidth for VoIP $BW_v$ is displayed.

In Step 1590, the required bandwidth for data traffic $BW_d$ is displayed.

In Step 1600, the total bandwidth BW is displayed.

Traffic Based High Speed Data Traffic (TB-HSDT) Calculator

With reference to FIG. 8, the Traffic Based High Speed Data Traffic (TB-HSDT) calculator enables Internet Service Providers (ISPs) to plan and expand their access network capacities based on modeling of real network traffic. The user of the calculator can choose built-in traffic models fitted from typical traffic traces or build a model from user-provided statistics or a data file containing a traffic trace. The calculator computes any one of the following three quantities: access link bandwidth BW, the maximum number of subscribers numSub, or QoS (related to blocking probability p by the formula p=1−QoS/100), when the other two quantities are given.

The procedure of the calculations is as follows: fit a traffic trace for $N_0$ subscribers by a Gamma model $\Gamma(\alpha_0, \theta_0)$; then conduct the network capacity planning by assuming the traffic generated by N subscribers (with similar usage patterns) has the related Gamma distribution $\Gamma(\alpha_0*HD/ABS*N/N_0, \theta_0)$.

In Step 1710, the TB-HSDT calculator prompts the user to input the HD/ABS ratio for the data traffic of subscribers on the access network being studied or planned. The HD/ABS ratio is greater than 1.0 but has no theoretical maximum value. Accordingly, a default HD/ABS ratio value of 1.2 and a range of 1.1 to 1.3 are suggested by the calculator, based on some analysis of data traffic measurements from service providers. Tool users who have reliable HD/ABS load ratio information for their own subscribers should use that information rather than default values suggested by the calculator.

In Step 1720, the user of the TB-HSDT calculator specifies which model to use for bandwidth provisioning. The user can choose the default model or select a model by using the model selection module of the calculator. If the user chooses to use the default model, then proceed to Step 1740.

In Step 1730, if the user chooses not to use the default model, the calculator launches the model selection module (see FIG. 10), which is described below.

In Step 1740, the user of the calculator specifies the quantity to be calculated. The calculator can conduct any of the following three calculations:

(i) Find the required amount of bandwidth BW given QoS (related to blocking probability p by the formula p=1−QoS/100) and the number of subscribers numSub, as described in Steps 1750-1780;

(ii) Find the blocking probability p given the number of subscribers numSub and the available bandwidth BW, as described in Steps 1790-1820; or (iii) Find the maximal number of subscribers numSub that the network can support given BW and blocking probability p, as described in Steps 1830-1860.

In Step 1750, having already chosen to compute BW, the calculator user inputs the number of subscribers numSub.

In Step 1760, the user inputs the QoS expressed as a percentage between 0% and 100%. QoS is related to the allowable blocking probability p by the formula p=1−QoS/100.

In Step 1770, the required amount of bandwidth BW is computed by the following formula:

$$BW = \Gamma^{-1}(1-p, \alpha_0*HD/ABS*numSub/N_0, \theta_0),$$

where $\Gamma^{-1}$ is the inverse of the Gamma distribution function, p is blocking probability, $\alpha_0$ and $\theta_0$ are the parameters of the selected Gamma model, and $N_0$ is the number of subscribers that generated the associated traffic trace.

In Step 1780, the computed BW expressed in Mbps is displayed.

In Step 1790, having already chosen to compute the QoS designated by blocking probability, the calculator user inputs the number of subscribers, numSub.

In Step 1800, the calculator user inputs the available bandwidth BW in Mbps.

In Step 1810, the calculator computes the blocking probability p using:

$$p = 1 - \Gamma(BW, \alpha_0*HD/ABS*numSub/N_0, \theta_0),$$

and then the $$QoS = 100(1-p).$$

In Step 1820, the QoS, which is a percentage between 0% and 100% based on the calculated blocking probability p, is displayed.

In Step 1830, having already chosen to compute numSub, the maximum number of subscribers supported, the calculator user inputs BW.

In Step 1840, the user inputs the desired QoS expressed as a percentage between 0% and 100%. It is related to the blocking probability p by the equation QoS=100(1−p).

In Step 1850, the calculator computes the maximum number of subscribers supported, numSub, by one-dimensional search, that is, it finds the largest integer n such that $$\Gamma(BW, \alpha_0*n*HD/ABS/N_0, \theta_0) < 1-p.$$

In Step 1860, the computed numSub is displayed.

Cable TV Calculator

Cable television is a traditional analog medium to transmit TV programs. In practice, to increase the transmission capacity of cable TV systems, the cable spectrum is divided into analog channels with each channel 6 MHz wide. Advanced modulation technologies are then applied to modulate many digital channels into a single analog channel and thus substantially increase the capacity of the cable TV system. With reference to FIG. 9, the Cable TV Calculator allows cable TV companies to compute their planned network capacities after converting some analog channels to digital. This calculator assumes that Quadrature Amplitude Modulation (QAM) is used to modulate the digital signals.

In Step 1910, the user of the Cable TV Calculator chooses a QAM option. The Cable TV Calculator provides three options: QAM64, QAM128 and QAM256. The selected QAM determines the bandwidth in terms of Mbps per analog channel, called QAMRate. The QAM rates of QAM64, QAM128, QAM256 are 29.172, 34.034, and 38.896 Mbps, respectively.

In Step 1920, the user of the Cable TV Calculator inputs the chosen video codec. A video codec converts analog video signals into a digital bit stream for transmission. At the receiving end, the codec converts the digital bit stream back into analog video signals. Denote by $R_1$ the bit rate of a codec. The calculator assumes the Moving Picture Expert Group (MPEG) codec formats. The calculator offers two codec formats: MPEG2 and MPEG4.

In Step 1930, the user of the Cable TV Calculator selects the resolution. The resolution is either HD (high definition) or SD (standard definition) with HD having a better picture quality at the cost of a higher bandwidth requirement. In SD and HD modes, the bit rates of MPEG2 are 3.75 and 12.5 Mbps, respectively. The bit rate of MPEG4 is 1.5 Mbps.

In Step 1940, the user of the Cable TV Calculator specifies whether the codec is in CBR (constant bit rate) or VBR (variable bit rate) mode. In CBR mode, the codec uses the same amount of bandwidth all the time. In VBR mode, the bandwidth requirement of the codec varies depending on the complexity of the program content. VBR mode reduces the total bandwidth requirement, but makes provisioning more complicated. If the user chooses the CBR mode, proceed to Step 1950, otherwise proceed to Step 2040.

In Step 1950, the tool user specifies what quantity is to be calculated. In the CBR mode, the calculator is capable of conducting either of the two calculations: (i) Find the number of digital channels that can fit in a given number of analog channels, as described in Steps 1960-1990; or (ii) Find how many analog channels are needed for a given number of digital channels, as described in Steps 2000-2030.

In Step 1960, the tool determines how many digital channels can fit in the range allocated for one analog channel by dividing the amount of bandwidth in Mbps of one analog channel, as determined by the selected QAM, by the bit rate of the selected codec $R_1$. The resulting number of digital channels that can fit in one analog channel is denoted by digitalChPerAnalog.

In Step 1970, the user of the Cable TV Calculator inputs the number of analog channels to be converted into digital ones.

In Step 1980, the tool calculates the total number of digital channels using the formula:

$$num\text{Digital}Ch = num\text{A analog}Ch * \text{digital}Ch\text{PerAnalog}.$$

If numDigitalCh is not a whole number, it is reduced to the next whole number.

In Step 1990, the resulting number of digital channels is displayed.

In Step 2000, because the user has already chosen to compute the number of analog channels, the tool determines how many digital channels can fit in one analog channel by dividing the bandwidth (in Mbps) of one analog channel, as determined by the selected QAM, by the bit rate of the selected codec $R_1$.

In Step 2010, the user of the Cable TV Calculator inputs numDigitalCh, the number of digital channels that must be converted from analog channels.

In Step 2020, the Cable TV Calculator computes the number of analog channels needed numAnalogCh with the formula:

$$num\text{Analog}Ch = num\text{Digital}Ch / \text{digital}Ch\text{PerAnalog}.$$

If numAnalogCh is not a whole number, it is increased to the next whole number.

In Step 2030, the resulting number of analog channels numAnalogCh is displayed.

If the user of the Cable TV Calculator chooses VBR mode, in Step 2040 the user is prompted to choose a built-in VBR bandwidth model. When a codec is used with variable bit rate, its bandwidth requirement varies over time. A VBR bandwidth model is used to specify how much bandwidth is needed to transmit a given number of distinct videos simultaneously.

There are four built-in models in the calculator: Liberal, Moderate and Conservative, as well as a User-Defined option. The Liberal model represents a low bandwidth model; the Moderate model assumes medium bandwidth consumption and the Conservative model supposes high bandwidth consumption. In order, these three qualitative descriptions are associated with increasing QoS levels, and diminishing probabilities that not all the bandwidth required for video transmission will be available. Each of the four models is characterized by its individual Gamma model $\Gamma(\alpha_0, \theta_0)$ with parameters $\alpha_0$ and $\theta_0$.

The User-Defined option lets the user specify the bandwidth model by providing the mean and variance of the bitrate. With mean and variance available, the calculator computes the parameters of the Gamma model as follows:

$$\theta_0 = \text{variance/mean},$$

$$\alpha_0 = \text{mean}^2/\text{variance}.$$

In Step 2050, the tool user specifies what quantity is to be calculated. In VBR mode, the calculator is capable of conducting any of the following three calculations:

(i) Find the number of digital channels that can fit in a given number of analog channels, as described in Steps 2060-2100;

(ii) Find the QoS, as described in Steps 2110-2140; or (iii) Find the number of analog channels, numAnalogCh, that must be converted to obtain a given number of digital channels, as described in Steps 2150-2190.

In Step 2060, having already chosen to calculate the number of digital channels provided by a given number of analog channels, the tool user enters QoS, expressed as a percentage between 0% and 100%. QoS is related to the blocking probability p by the formula p=1−QoS/100.

In Step 2070, the tool computes the number of digital channels, digitalChPerAnalog, that can fit in one analog channel. That is, it uses the one-dimensional search to find the maximal integer n that satisfies $$\Gamma(QAM\text{Rate}, n*\alpha_0, \theta_0) \leq 1-p,$$

where $\Gamma$ is the Gamma cumulative distribution function. The largest integer n satisfying the above inequality is set as the value of digitalChPerAnalog.

In Step 2080, the user of the Cable TV Calculator inputs numAnalogCh, the number of analog channels to be converted into digital.

In Step 2090, the Cable TV Calculator computes the number of digital channels, numDigitalCh, with the formula:

$$num\text{Digital}Ch = num\text{Analog}Ch * \text{digital}Ch\text{PerAnalog}.$$

In Step 2100, the resulting total number of digital channels is displayed.

In Step 2110, having already chosen to compute QoS, which is related to the blocking probability p by the formula p=1−QoS/100, the user of the Cable TV Calculator inputs the number of available analog channels, numAnalogCh.

In Step 2120, the user of the Cable TV Calculator inputs the number of digital channels, numDigitalCh, to be fitted into the available analog channels.

In Step 2130, first calculate the blocking probability p with the following formula:

$$p = 1 - \Gamma(QAM\text{Rate}, num\text{Digital}Chs/num\text{Analog}Ch*\alpha_0, \theta_0)$$

and then the related QoS using the formula QoS=100*(1−p).

In Step 2140, the resulting QoS is displayed.

In Step 2150, the user has already chosen to compute the number of analog channels, numAnalogCh, needed to provide a given number of digital channels. In this step, the tool user enters the QoS, which is expressed as a percentage between 0% and 100% and related to the blocking probability p by the formula p=1−QoS/100.

In Step 2160, the tool computes digitalChPerAnalog, the number of digital channels that can fit into one analog channel. That is, the tool uses one-dimensional search to find the largest positive integer n that satisfies $$\Gamma(QAMRate, n*\alpha_0, \theta_0) \le 1-p,$$

where $\Gamma$ is the Gamma cumulative distribution function. The largest positive integer n satisfying the above inequality is set as the value of digitalChPerAnalog.

In Step 2170, the user of the Cable TV Calculator inputs numDigitalCh, the number of digital channels to be obtained by converting analog channels.

In Step 2180, the calculator computes the total number of analog channels that must be converted into digital by $$numAnalogCh = numDigitalCh / digitalChPerAnalog.$$

If numAnalogCh is not a whole number, it is rounded up to the next whole number.

In Step 2190, the resulting number of analog channels is displayed.

Model Selection Module

The Model Selection Module, as shown in FIG. 10, enables the user to choose the appropriate model for bandwidth provisioning, which occurs at Step 580 of the Voice and Traffic Based Data Calculator, and at Step 1720 of the Traffic Based High Speed Data Traffic (TB-HSDT) Calculator. The model to be used for provisioning has three parameters $\alpha_0$, $\theta_0$ and $N_0$, where $\Gamma(\alpha_0, \theta_0)$ denotes the Gamma cumulative distribution that models the default trace and $N_0$ denotes the number of subscribers that generated the default trace.

In Step 3010, the user is prompted to choose any one of four available options to build the model:
 i. the NI model;
 ii. a model built from 1-second average loads in busy hour;
 iii. a model based on 5-minute average loads to be input; or
 iv. a model to be built from a traffic trace provided by the user.

In Step 3020, if the user chose to apply the NI model, the values of the Gamma distribution parameters alpha and theta obtained from the traffic trace provided by an ISP denoted by NI are loaded into the calculator. Go to Step 600 for the Voice and Traffic Based Data Calculator, or to Step 1740 for the TB-HSDT Calculator.

In Step 3030, if the user chose the model based on 1-second average loads in the busy hour, the user inputs the number of subscribers.

In Step 3040, the user inputs the average aggregated load in Mbps.

In Step 3050, the user inputs the load variance in Mbps$^2$. Proceed to Step 3160.

In Step 3060, if the user chose a model based on 5-min average loads in the busy hour, the user inputs the number of subscribers.

In Step 3070, the user inputs twelve 5-min average loads in the busy hour.

In Step 3080, the calculator computes the average of the 12 average loads from the busy hour taken at five minute intervals.

In Step 3090, the calculator computes the variance of the 12 average loads from the busy hour taken at five minutes intervals.

In Step 3100, the calculator estimates the load variance at a 1-second load resolution by scaling the variance of the twelve 5-min loads. Go to Step 3160.

In Step 3110, if the user chose to build the provisioning model from a file, in this step the user inputs the number of subscribers that generated the traffic.

In Step 3120, the user specifies the name of the file that stores the traffic.

In Step 3130, the busy hour traffic data are extracted from the traffic trace file.

In Step 3140, the average of the 1-second average loads in the busy hour is computed.

In Step 3150, the variance of the 1-second average loads in the busy hour is calculated.

In Step 3160, with the mean and variance of 1-second busy hour loads available, the calculator now computes the parameters $\theta_0$ and $\alpha_0$ of the Gamma model using the method of moments as follows:

$$\theta_0 = variance/average.$$

$$\alpha_0 = average/\theta_0.$$

Many modifications and other embodiments of the invention will come to the mind of one skilled in the art having the benefit of the teachings presented in the foregoing description and associated drawings. For example, graphical capabilities can be embedded throughout the tools to enable the tool user to see instantly how the calculated output varies over selected ranges of one or more input quantities. The capabilities of the Cable TV Calculator for planning conversions from analog to digital channels could be directly extended to similar applications for Satellite TV. The Cable TV Calculator could also be extended for video on demand services, by modeling the extra bandwidth needed when multiple autocorrelated copies of individual highly popular videos are played at various start times. The data traffic tools currently based on both stored and dynamically fitted Gamma distributions can be extended to mixtures of Gamma distributions or to other statistical models to accommodate possible changes in internet traffic patterns. Some additional examples of such modifications would include, but not be limited to, the following: addition of Erlang B, Poisson and the Engset (finite source) voice traffic models for VoIP calculations, the number of VoIP codecs covered in the tool, their voice payloads, and whether or not silence suppression is used. The mix of internet protocols and physical media can easily be expanded from that which generated the current codec bandwidth requirements. Tool capabilities could be extended in order to compute upstream bandwidth requirements (i.e., away from the subscriber). Currently, the tool computes only downstream bandwidth requirements (i.e., toward the subscriber) because downstream traffic usually dominates. In addition, although the focus of the tool is on access network planning, there may be private network and core network planning applications of the tool in its present or modified form. Finally, the focus of the tools on access network bandwidth planning can be readily extended to data packet capacity planning. This is clear for VoIP where there is a direct translation from bandwidth to the number of VoIP packets which must be processed, for example, in real time resource calculations. With general internet data traffic, average packet size statistics, which are quite stable, can be used. Therefore, it is understood that the invention is not to be limited to the specific embodiment disclosed, and that modifications and embodiments are intended to be included within the scope of the appended claims.

We claim:

1. A method of capacity planning for an access network, comprising the steps of:
   (A) selecting network and traffic parameters for the access network;
   (B) selecting a first value and a second value;
   (C) calculating a predictive result comprising a third value, by applying a calculation model selected from the group consisting of a Gamma distribution, a Gaussian distribution, and a dimensioning formula; and
   (D) providing the predictive result,
   wherein at least step (C) is performed using a microprocessor-based system having data storage and a data acquisition connection configured to receive data on network traffic from network nodes, wherein network data from the data acquisition connection is stored in the data storage and is converted to a signal and transmitted to the microprocessor, and wherein the first value is a number of subscribers value, the second value is a bandwidth value, and the third value is a quality of service value, and wherein the quality of service value is determined from the bandwidth value and the number of subscribers value, and wherein the quality of service value is a useful rate divided by an access rate.

2. The method of claim 1, wherein said network and traffic parameters comprise one or more of a codec, an average busy season load, a ratio of high day load to average busy season load, or a bandwidth overhead percentage.

3. The method of claim 1, wherein each of the access network and traffic parameters, quality of service value, and number of subscribers value further comprise a first and a second number, said first number for voice traffic with calculations based on the Gaussian distribution model and said second number relating to data traffic with calculations based on the Gamma distribution model.

4. The method of claim 1, wherein each of the access network and traffic parameters, quality of service value, and number of subscribers value further comprise a first and a second number, said first number for voice traffic with calculations based on the Gaussian distribution model and said second number relating to data traffic with calculations based on the dimensioning formula model.

5. A method of capacity planning for an access network, comprising the steps of:
   (A) selecting network and traffic parameters for the access network;
   (B) selecting a first value and a second value;
   (C) calculating a predictive result comprising a third value, by applying a calculation model selected from the group consisting of a Gamma distribution, a Gaussian distribution, and a dimensioning formula; and
   (D) providing the predictive result,
   wherein at least step (C) is performed using a microprocessor-based system having data storage and a data acquisition connection configured to receive data on network traffic from network nodes, wherein network data from the data acquisition connection is stored in the data storage and is converted to a signal and transmitted to the microprocessor, and wherein the first value is a number of subscribers value, the second value is a bandwidth value, and the third value is a quality of service value, and wherein the quality of service value is determined from the bandwidth value and the number of subscribers value, wherein the quality of service value is related to a blocking probability, and is determined by the formula:

quality of service=100*(1−blocking probability).

6. The method of claim 5, wherein said network and traffic parameters comprise one or more of a codec, an average busy season load, a ratio of high day load to average busy season load, or a bandwidth overhead percentage.

7. The method of claim 5, wherein each of the access network and traffic parameters, quality of service value, and number of subscribers value further comprise a first and a second number, said first number for voice traffic with calculations based on the Gaussian distribution model and said second number relating to data traffic with calculations based on the Gamma distribution model.

8. The method of claim 5, wherein each of the access network and traffic parameters, quality of service value, and number of subscribers value further comprise a first and a second number, said first number for voice traffic with calculations based on the Gaussian distribution model and said second number relating to data traffic with calculations based on the dimensioning formula model.

9. A method of capacity planning for an access network, comprising the steps of:
   (A) selecting network and traffic parameters for the access network;
   (B) selecting a first value and a second value;
   (C) calculating a predictive result comprising a third value, by applying a calculation model selected from the group consisting of a Gamma distribution, a Gaussian distribution, and a dimensioning formula; and
   (D) providing the predictive result,
   wherein at least step (C) is performed using a microprocessor-based system having data storage and a data acquisition connection configured to receive data on network traffic from network nodes, wherein network data from the data acquisition connection is stored in the data storage and is converted to a signal and transmitted to the microprocessor, and wherein the first value is a number of subscribers value, the second value is a quality of service value, and the third value is a bandwidth value, and wherein the bandwidth value is determined from the quality of service value and the number of subscribers value, and wherein the quality of service value is a useful rate divided by an access rate.

10. The method of claim 9, wherein said network and traffic parameters comprise one or more of a codec, an average busy season load, a ratio of high day load to average busy season load, or a bandwidth overhead percentage.

11. The method of claim 9, wherein each of the access network and traffic parameters, quality of service value, and number of subscribers value further comprise a first and a second number, said first number for voice traffic with calculations based on the Gaussian distribution model and said second number relating to data traffic with calculations based on the Gamma distribution model.

12. The method of claim 9, wherein each of the access network and traffic parameters, quality of service value, and number of subscribers value further comprise a first and a second number, said first number for voice traffic with calculations based on the Gaussian distribution model and said second number relating to data traffic with calculations based on the dimensioning formula model.

* * * * *